United States Patent
Huo et al.

(10) Patent No.: US 12,389,003 B2
(45) Date of Patent: Aug. 12, 2025

(54) TRANSFORM METHOD, ENCODER, DECODER, AND STORAGE MEDIUM

(71) Applicant: GUANGDONG OPPO MOBILE TELECOMMUNICATIONS CORP., LTD., Guangdong (CN)

(72) Inventors: Junyan Huo, Guangdong (CN); Xinwei Li, Guangdong (CN); Wenhan Qiao, Guangdong (CN); Yanzhuo Ma, Guangdong (CN); Shuai Wan, Guangdong (CN); Fuzheng Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 392 days.

(21) Appl. No.: 17/807,639

(22) Filed: Jun. 17, 2022

(65) Prior Publication Data
US 2022/0329809 A1    Oct. 13, 2022

Related U.S. Application Data

(63) Continuation of application No. PCT/CN2019/130127, filed on Dec. 30, 2019.

(51) Int. Cl.
*H04N 19/129* (2014.01)
*H04N 19/159* (2014.01)
(Continued)

(52) U.S. Cl.
CPC ......... *H04N 19/129* (2014.11); *H04N 19/159* (2014.11); *H04N 19/176* (2014.11); *H04N 19/88* (2014.11)

(58) Field of Classification Search
CPC ...... H04N 19/105; H04N 19/12; H04N 19/70; H04N 19/593; H04N 19/18; H04N 19/129
See application file for complete search history.

(56) References Cited

U.S. PATENT DOCUMENTS

| 2017/0094313 A1 | 3/2017 | Zhao et al. |
| 2019/0306526 A1 | 10/2019 | Cho et al. |

(Continued)

FOREIGN PATENT DOCUMENTS

| CN | 106254883 A | 12/2016 |
| CN | 108141597 A | 6/2018 |
| CN | 109076222 A | 12/2018 |

OTHER PUBLICATIONS

Bross, B., et al., Joint Video Experts Team (JVET)—of ITU-T SG 16 WP 3 and ISO/IEC JTC 1/SC 29/WG 11—16th Meeting: Geneva, CH, Oct. 1-11, 2019—Document: JVET-P2001-vDvE—Versatile Video Coding (Draft 7) (494 pages).

(Continued)

*Primary Examiner* — Daniel Chang
(74) *Attorney, Agent, or Firm* — PERKINS COIE LLP

(57) ABSTRACT

A transform method includes: determining a prediction mode parameter of a current block; determining a MIP parameter when the prediction mode parameter indicates that MIP is used for the current block to determine an intra prediction value; determining the intra prediction value of the current block according to the MIP parameter, and calculating a residual value between the current block and the intra prediction value; performing a first transform on the residual value to obtain a first coefficient matrix; determining a scanning order of LFNST coefficients used for the current block according to the MIP parameter when an LFNST is used for the current block; constructing an input coefficient matrix of the LFNST based on the first coefficient (Continued)

matrix according to the scanning order of LFNST coefficients; and performing an LFNST processing on the input coefficient matrix to obtain a transform coefficient matrix of the current block.

10 Claims, 9 Drawing Sheets

(51) Int. Cl.
    *H04N 19/176*    (2014.01)
    *H04N 19/88*    (2014.01)

(56) References Cited

U.S. PATENT DOCUMENTS

| | | | | |
|---|---|---|---|---|
| 2019/0313102 | A1 | 10/2019 | Cho et al. | |
| 2020/0396455 | A1* | 12/2020 | Liu | H04N 19/122 |
| 2021/0092405 | A1* | 3/2021 | Biatek | H04N 19/70 |
| 2021/0160506 | A1* | 5/2021 | Auyeung | H04N 19/70 |
| 2022/0060751 | A1* | 2/2022 | Nam | H04N 19/12 |
| 2022/0103849 | A1* | 3/2022 | Paluri | H04N 19/186 |
| 2022/0132132 | A1* | 4/2022 | Choi | H04N 19/176 |
| 2022/0174284 | A1* | 6/2022 | Choi | H04N 19/18 |
| 2022/0210470 | A1* | 6/2022 | Lin | H04N 19/593 |
| 2022/0224921 | A1* | 7/2022 | Hendry | H04N 19/174 |
| 2022/0256150 | A1* | 8/2022 | Koo | H04N 19/18 |
| 2022/0286669 | A1* | 9/2022 | Hendry | H04N 19/176 |
| 2022/0329809 | A1* | 10/2022 | Huo | H04N 19/129 |
| 2022/0329862 | A1* | 10/2022 | Huo | H04N 19/159 |
| 2022/0360785 | A1* | 11/2022 | Huo | H04N 19/159 |

OTHER PUBLICATIONS

International Search Report issued Oct. 10, 2020 of PCT/CN2019/130127 (6 pages).
ITU-T—H.265 (Apr. 2013)—Telecommunication Standardization Sector of ITU—Series H: Audiovisual and Multimedia Systems—Infrastructure of audiovisual services—Coding of moving video, High efficiency video coding (317 pages).
ITU-T—H.265 (Feb. 2018)—Telecommunication Standardization Sector of ITU—Series H: Audiovisual and Multimedia Systems—Infrastructure of audiovisual services—Coding of moving video, High efficiency video coding (692 pages).
ITU-T—H.265 (Apr. 2015)—Telecommunication Standardization Sector of ITU—Series H: Audiovisual and Multimedia Systems Infrastructure of audiovisual services—Coding of moving video, High efficiency video coding (634 pages).
ITU-T—H.265 (Jun. 2019)—Telecommunication Standardization Ector of ITU—Series H: Audiovisual and Multimedia Systems—Infrastructure of audiovisual services—Coding of moving video, High efficiency video coding (696 pages).
ITU-T—H.265 (Aug. 2021)—Telecommunication Standardization Sector of ITU—Series H: Audiovisual and Multimedia Systems—Infrastructure of audiovisual services—Coding of moving video, High efficiency video coding (716 pages).
ITU-T—H.265 (Oct. 2014)—Telecommunication Standardization Sector of ITU—Series H: Audiovisual and Multimedia Systems—Infrastructure of audiovisual services—Coding of moving video, High efficiency video coding (540 pages).
ITU-T—H.265 (Nov. 2019)—Telecommunication Standardization Sector of ITU—Series H: Audiovisual and Multimedia Systems—Infrastructure of audiovisual services—Coding of moving video, High efficiency video coding (712 pages).
ITU-T—H.265 (Dec. 2016)—Telecommunication Standardization Sector of ITU—Series H: Audiovisual and Multimedia Systems—Infrastructure of audiovisual services—Coding of moving video, High efficiency video coding (664 pages).
ITU-T—H.266 (Aug. 2020)—Telecommunication Standardization Sector of ITU—Series H: Audiovisual and Multimedia Systems—Infrastructure of audiovisual services—Coding of moving video, Versatile video coding (516 pages).
Joint Video Experts Team (JVET)—of ITU-T SG 16 WP 3 and ISO/IEC JTC 1/SC 29/WG 11—14th Meeting: Geneva, CH, Mar. 19-27, 2019—Document: JVET-N0193—LG Electronics Inc., CE6: Reduced Secondary Transform (RST) (CE6-3.1) (19 pages).
Joint Video Experts Team (JVET)—of ITU-T SG 16 WP 3 and ISO/IEC JTC 1/SC 29/WG 11—14th Meeting: Geneva, CH, Mar. 19-27, 2019—Document: JVET-N0217—Fraunhofer HHI, CE3: Affine linear weighted intra prediction (CE3-4.1, CE3-4.2) (17 pages).
Joint Video Experts Team (JVET)—of ITU-T SG 16 WP 3 and ISO/IEC JTC 1/SC 29/WG 11—15th Meeting: Gothenburg, SWE, Jul. 3-12, 2019—Document: JVET-O0485-r12—Fraunhofer HHI, Non-CE3: Harmonization of 8-Bit MIP with Unified-MPM and LFNST (4 pages).
Joint Video Experts Team (JVET)—of ITU-T SG 16 WP 3 and ISO/IEC JTC 1/SC 29/WG 11—15th Meeting: Gothenburg, SE, Jul. 3-12, 2019—Document: JVET-O0529—InterDigital Communications, Inc., Non-CE6 Interaction between Implicit MTS and LFNST and MIP (6 pages).
Written Opinion of the International Searching Authority mailed Oct. 10, 2020 of PCT/CN2019/130127. (8 pages).
Bross, B. et al. "Versatile Video Coding (Draft 5)" JVET-N1001-v8; JVET of ITU-T 16 WP 3 and ISO/IEC JTC 1/SC 29/WG 11; 14th meeting: Geneva, CH; Mar. 19-27, 2019. 397 pages.
Extended European Search Report for European Application No. 19958126.5 issued Dec. 8, 2022. 6 pages.
Koo, M. et al. "Low Frequency Non-Separable Transform (LFNST)" 2019 Picture Coding Symposium (PCS); Nov. 12-15, 2019, Ningbo, China. 5 pages.

* cited by examiner

TRANSFORM METHOD, ENCODER, DECODER, AND STORAGE MEDIUM

CROSS-REFERENCE TO RELATED APPLICATION

The present application is a continuation application of the International PCT Application No. PCT/CN2019/130127, having an international filing date of Dec. 30, 2019, the entire content of which is hereby incorporated by reference.

TECHNICAL FIELD

Embodiments of the present application relate to the field of picture processing technologies, and more particularly, to a transform method, an encoder, a decoder, and a storage medium.

BACKGROUND

With improvement of people's requirements for video display quality, new video application forms such as high-definition and ultra-high-definition videos have emerged. H.265/High Efficiency Video Coding (HEVC) has become unable to meet requirements of rapid development of video applications. The Joint Video Exploration Team (JVET) proposes the next generation video coding standard H.266/Versatile Video Coding (VVC), a corresponding test model of which is a VVC Test Model (VTM).

In H.266/VVC, a Reduced Second Transform (RST) technology has been accepted and renamed as a Low-Frequency Non-Separable Transform (LFNST) technology. Since selection of a scanning order in the LFNST technology is performed according to an intra prediction mode, but for a non-traditional intra prediction mode, lack of variability in LFNST transform reduces an encoding efficiency.

SUMMARY

The embodiments of the present application provide a transform method, an encoder, a decoder, and a storage medium, which may improve applicability of an LFNST technology to a non-traditional intra prediction mode, so that selection of a scanning order is more flexible, thus improving an encoding efficiency.

Technical solutions of the embodiments of the present application may be implemented as follows.

In a first aspect, an embodiment of the present application provides a transform method, which is applied to an encoder, and the transform method includes: determining a prediction mode parameter of a current block; determining a Matrix-based Intra Prediction (MIP) parameter when the prediction mode parameter indicates that MIP is used for the current block to determine an intra prediction value; determining the intra prediction value of the current block according to the MIP parameter, and calculating a residual value between the current block and the intra prediction value; performing a first transform on the residual value to obtain a first coefficient matrix; determining a scanning order of Low-Frequency Non-Separable Transform (LFNST) coefficients used for the current block according to the MIP parameter when an LFNST is used for the current block; constructing an input coefficient matrix of the LFNST by using the first coefficient matrix according to the scanning order of LFNST coefficients; and performing an LFNST processing on the input coefficient matrix to obtain a transform coefficient matrix of the current block; wherein, the first transform is a transform different from the LFNST, and scanning orders of LFNST coefficients include a horizontal scanning order and a vertical scanning order.

In a second aspect, an embodiment of the present application provides an inverse transform method, which is applied to a decoder, and the transform method includes: parsing a bitstream and determining a prediction mode parameter of a current block; parsing the bitstream and determining a MIP parameter when the prediction mode parameter indicates that MIP is used for the current block to determine an intra prediction value; parsing the bitstream and determining a transform coefficient matrix and an LFNST index of the current block; processing the transform coefficient matrix of the current block by using an LFNST to obtain an LFNST output coefficient matrix when the LFNST index indicates that the LFNST is used for the current block; determining a scanning order of LFNST coefficients used for the current block according to the MIP parameter; and constructing a first coefficient matrix by using the LFNST output coefficient matrix according to the scanning order of LFNST coefficients; wherein, the scanning order of LFNST coefficients includes a vertical scanning order and a horizontal scanning order.

In a third aspect, an embodiment of the present application provides an encoder, which includes a first determination unit, a first calculation unit, a first transform unit, and a first construction unit; wherein, the first determination unit is configured to determine a prediction mode parameter of a current block; and to determine a MIP parameter when the prediction mode parameter indicates that MIP is used for the current block to determine an intra prediction value; the first calculation unit is configured to determine the intra prediction value of the current block according to the MIP parameter, and to calculate a residual value between the current block and the intra prediction value; the first transform unit is configured to perform a first transform on the residual value to obtain a first coefficient matrix; the first determination unit is further configured to determine a scanning order of LFNST coefficients used for the current block according to the MIP parameter when an LFNST is used for the current block; the first construction unit is configured to construct an input coefficient matrix of the LFNST by using the first coefficient matrix according to the scanning order of LFNST coefficients; and the first transform unit is further configured to perform an LFNST processing on the input coefficient matrix to obtain a transform coefficient matrix of the current block; wherein, the first transform is a transform different from the LFNST, and scanning orders of LFNST coefficient include a horizontal scanning order and a vertical scanning order.

In a fourth aspect, an embodiment of the present application provides an encoder, which includes a first memory and a first processor; wherein, the first memory is configured to store a computer program runnable on the first processor; and the first processor is configured to perform the method according to the first aspect when running the computer program.

In a fifth aspect, an embodiment of the present application provides a decoder, which includes a parsing unit, a second transform unit, a second determination unit, and a second construction unit; wherein, the parsing unit is configured to parse a bitstream and determine a prediction mode parameter of a current block; and to parse the bitstream and determine a MIP parameter when the prediction mode parameter indicates that MIP is used for the current block to determine an intra prediction value; the parsing unit is further configured to parse the bitstream and determine a transform coefficient matrix and an LFNST index of the current block; the second transform unit is configured to process the transform coefficient matrix of the current block by using an LFNST to obtain an LFNST output coefficient matrix when the LFNST index indicates that the LFNST is used for the current block; the second determination unit is configured to determine a scanning order of LFNST coefficients used for the current block according to the MIP parameter; and the second construction unit is configured to construct a first coefficient matrix by using the LFNST output coefficient matrix according to the scanning order of LFNST coefficients; wherein, the scanning order of LFNST coefficients includes a vertical scanning order and a horizontal scanning order.

In a sixth aspect, an embodiment of the present application provides a decoder, which includes a second memory and a second processor; wherein, the second memory is configured to store a computer program runnable on the second processor; and the second processor is configured to perform the method according to the second aspect when running the computer program.

In a seventh aspect, an embodiment of the present application provides a computer storage medium having stored therein a computer program, wherein the method as described in the first aspect is implemented when the computer program is executed by a first processor, or the method as described in the second aspect is implemented when the computer program is executed by a second processor.

The embodiments of the present application provide a transform method, an encoder, a decoder, and a storage medium. Following acts are included: determining a prediction mode parameter of a current block; determining a MIP parameter when the prediction mode parameter indicates that MIP is used for the current block to determine an intra prediction value; according to the MIP parameter, determining the intra prediction value of the current block, and calculating a residual value between the current block and the intra prediction value; performing a first transform on the residual value to obtain a first coefficient matrix; determining a scanning order of LFNST coefficients used for the current block according to the MIP parameter when an LFNST is used for the current block; according to the scanning order of LFNST coefficients, constructing an input coefficient matrix of the LFNST by using the first coefficient matrix; and performing an LFNST processing on the input coefficient matrix to obtain a transform coefficient matrix of the current block; wherein, the first transform is a transform different from the LFNST, and scanning orders of LFNST coefficients include a horizontal scanning order and a vertical scanning order. In this way, for a current block using a MIP mode, a MIP parameter is introduced during an LFNST transform, so that selection of a scanning order of LFNST coefficients is more flexible, thus not only improving applicability of an LFNST technology to a non-traditional intra prediction mode, but also improving encoding and decoding efficiencies and video picture quality.

DETAILED DESCRIPTION

In order to understand features and technical contents of the embodiments of the present application in more detail, implementations of the embodiments of the present application will be described in detail below in combination with the accompanying drawings, which are for reference only and are not intended to limit the embodiments of the present application.

In a video picture, a Coding Block (CB) is generally characterized by using a first colour component, a second colour component, and a third colour component. These three colour components are a luma component, a blue chroma component, and a red chroma component respectively. Specifically, the luma component is usually represented by a symbol Y, the blue chroma component is usually represented by a symbol Cb or U, and the red chroma component is usually represented by a symbol Cr or V; in this way, the video picture may be expressed in YCbCr format or YUV format.

In an embodiment of the present application, the first colour component may be a luma component, the second colour component may be a blue chroma component, and the third colour component may be a red chroma component, which is not specifically limited in the embodiments of the present application.

Related technical solutions of a current LFNST technology will be described below.

Figure 1:
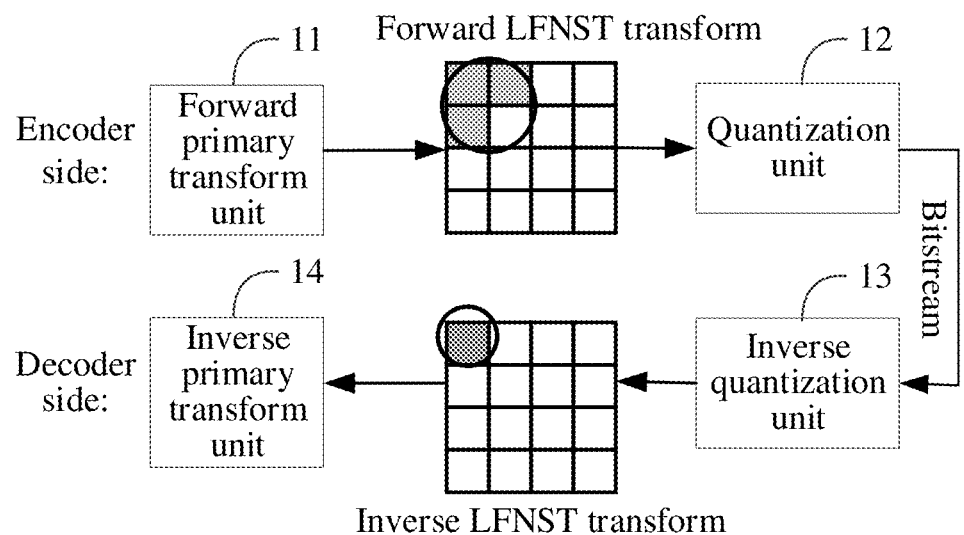
FIG. 1 is a schematic diagram of an application position of an LFNST technology according to a related technical solution.

Referring to FIG. 1, FIG. 1 shows a schematic diagram of an application position of an LFNST technology according to a related technical solution. As shown in FIG. 1, in an intra prediction mode, for an encoder side, the LFNST technology is applied between a positive primary transform unit 11 and a quantization unit 12, and the LFNST technology is applied between an inverse quantization unit 13 and an inverse primary transform unit 14.

Specifically, on the encoder side, firstly, for data, such as a prediction residual (which may be represented by residual), a first transform (which may be referred as "core transform" or "primary transform" or "main transform") is performed through the positive primary transform unit 11 to obtain a transform coefficient matrix after the first transform; then, an LFNST transform (which may be referred as "secondary transform" or "second transform") is performed on coefficients in the transform coefficient matrix to obtain an LFNST transform coefficient matrix; finally, the LFNST transform coefficient matrix is quantized through the quantization unit 12, and a final quantized value is signalled in a video bitstream.

On a decoder side, a quantized value of the LFNST transform coefficient matrix may be obtained by parsing the bitstream, and an inverse quantization processing (which may be referred as scaling) is performed on the quantized value through the inverse quantization unit 13 to obtain a restored value of the LFNST transform coefficient matrix, and a coefficient matrix may be obtained by performing an inverse LFNST transform on the restored value; then, an inverse transform corresponding to the core transform on the encoder side is performed on the coefficient matrix through the inverse primary transform unit 14, and a restored value of the residual is obtained finally. It should be noted that only an "inverse transform" operation on the decoder side is defined in the standard, such that an "inverse LFNST transform" in the standard is also referred as an "LFNST transform"; herein, in order to distinguish from a transform on the encoder side, an "LFNST transform" on the encoder side may be referred as a "forward LFNST transform" and an "LFNST transform" on the decoder side may be referred as an "inverse LFNST transform".

That is to say, on the encoder side, by performing a positive primary transform on a residual of a current transform unit, primary transform coefficients may be obtained; then the secondary transform is performed through matrix multiplication on a part of the primary transform coefficients to obtain a smaller quantity of more concentrated secondary transform coefficients, and then the secondary transform coefficients are quantized; on the decoder side, after parsing out a quantized value, an inverse quantization processing is performed on the quantized value, then an inverse secondary transform is performed through matrix multiplication on coefficients after inverse quantization, and then an inverse primary transform is performed on coefficients after the inverse secondary transform, so as to recover a residual.

In the LFNST technology, since a transform matrix is related to directional characteristics of a prediction mode, a scanning order is selected according to an intra prediction mode at present. Herein, on the encoder side, the scanning order refers to a scanning order in which two-dimensional primary transform coefficients are filled into one-dimensional primary transform coefficient vectors, while on the decoder side, the scanning order refers to a scanning order in which one-dimensional primary transform coefficient vectors are filled into a two-dimensional inverse primary transform coefficient matrix. For a traditional intra prediction mode, a value of an intra prediction mode indicator (which may be represented by predModeIntra) may be determined according to a serial number of the traditional intra prediction mode, and then a scanning order may be determined as a horizontal scanning order or a vertical scanning order according to a value of predModeIntra. However, for a non-traditional frame prediction mode, especially for a Matrix-based Intra Prediction (MIP) mode, a value of predModeIntra is directly set to indicate an index (i.e. 0) of an intra prediction mode corresponding to a PLANAR mode, so that a horizontal scanning order can only be selected for a current block in the MIP mode. Therefore, the current block in the MIP mode lacks variability when performing an LFNST transform, so that the LFNST technology cannot be well applied to the MIP mode and an encoding efficiency is also reduced.

In the embodiment of the present application, the transform method is provided, which is applied to an encoder. Among them, a prediction mode parameter of a current block is determined; a MIP parameter is determined when the prediction mode parameter indicates that MIP is used for the current block to determine an intra prediction value; the intra prediction value of the current block is determined according to a MIP parameter, and a residual value between the current block and the intra prediction value is calculated; a first transform is performed on the residual value to obtain a first coefficient matrix; a scanning order of LFNST coefficients used for the current block is determined according to the MIP parameter when an LFNST is used for the current block; according to the scanning order of the LFNST coefficients, an input coefficient matrix of the LFNST is constructed by using the first coefficient matrix; and an LFNST processing is performed on the input coefficient matrix to obtain a transform coefficient matrix of the current block; wherein, the first transform is different from the LFNST, and scanning orders of LFNST coefficients include a horizontal scanning order and a vertical scanning order. In this way, for the current block in a MIP mode, since the MIP parameter is introduced during an LFNST transform, selection of the scanning order of the LFNST coefficients is more flexible, thus not only improving applicability of the LFNST technology to a non-traditional intra prediction mode, but also improving encoding and decoding efficiencies and video picture quality.

Various embodiments of the present application will be described in detail below in combination with the accompanying drawings.

Figure 2A:
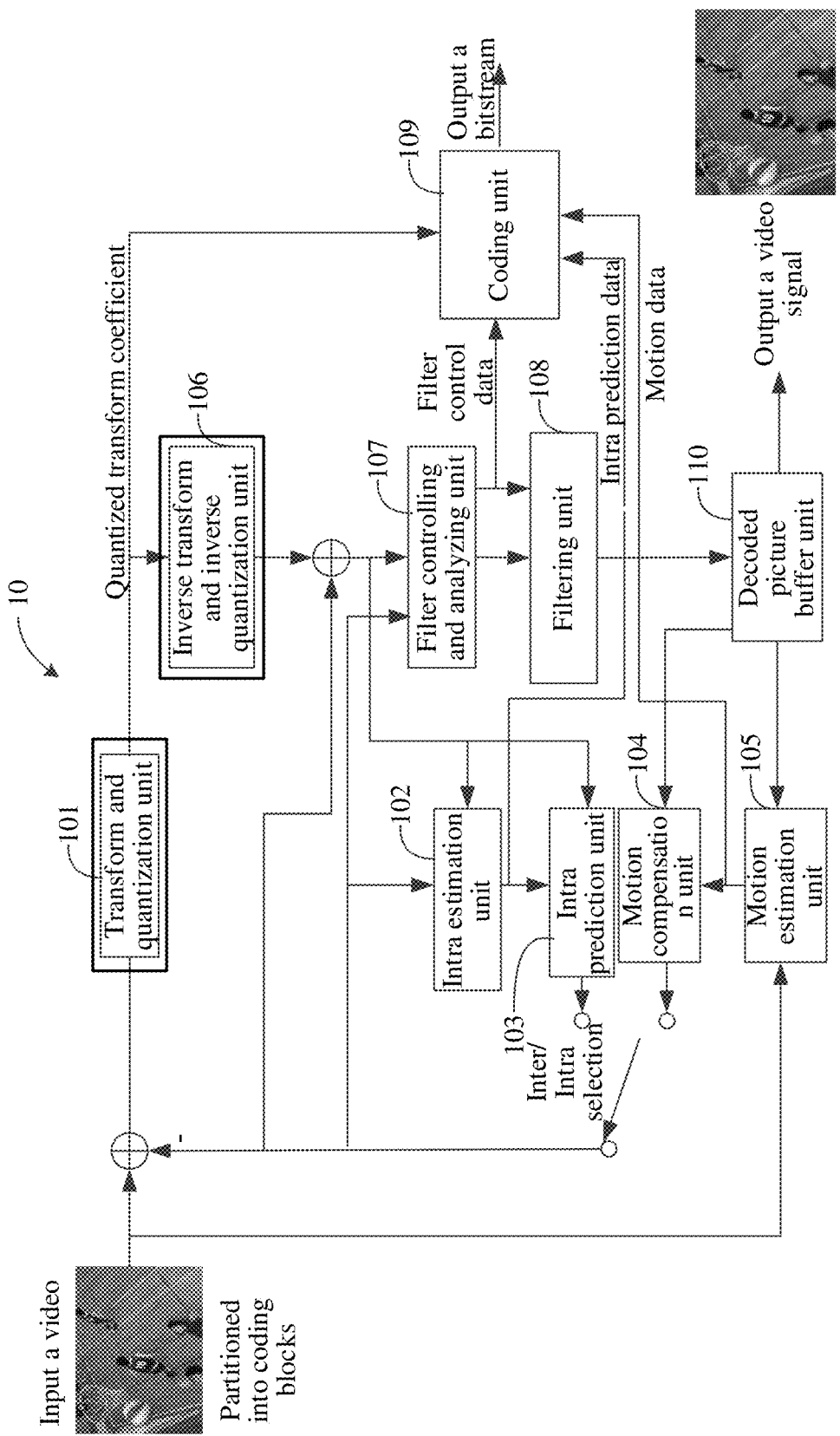
FIG. 2A is a composition block diagram of a video encoding system according to an embodiment of the present application.

Referring to FIG. 2A, which shows an exemplary composition block diagram of a video encoding system; as shown in FIG. 2A, the video encoding system 10 includes: a transform and quantization unit 101, an intra estimation unit 102, an intra prediction unit 103, a motion compensation unit 104, a motion estimation unit 105, an inverse transform and inverse quantization unit 106, a filter controlling and analyzing unit 107, a filtering unit 108, a coding unit 109, and a decoded picture buffer unit 110; wherein, the filtering unit 108 may implement de-blocking filtering and Sample Adaptive Offset (SAO) filtering, and the coding unit 109 may implement header information coding and Context-based Adaptive Binary Arithmetic Coding (CABAC). For an input original video signal, a video coding block may be obtained by partitioning a Coding Tree Unit (CTU), and then for residual pixel information obtained through intra or inter prediction, the video coding block is transformed through the transform and quantization unit 101, including transforming residual information from a pixel domain to a transform domain, and quantizing an obtained transform coefficient to further reduce a bit rate. The intra estimation unit 102 and the intra prediction unit 103 are used for intra prediction of the video coding block. Specifically, the intra estimation unit 102 and the intra prediction unit 103 are configured to determine an intra prediction mode to be used for encoding the video coding block. The motion compensation unit 104 and the motion estimation unit 105 are configured to perform inter prediction coding of the received video coding block with respect to one or more blocks in one or more reference frames to provide temporal prediction information; motion estimation performed by the motion estimation unit 105 is a process of generating a motion vector that may be used for estimating motion of the video coding block, and then the motion compensation unit 104 performs motion compensation based on the motion vector determined by the motion estimation unit 105; after determining the intra prediction mode, the intra prediction unit 103 is further configured to provide selected intra prediction data to the encoding unit 109, and the motion estimation unit 105 sends calculated and determined motion vector data to the encoding unit 109, too. In addition, the inverse transform and inverse quantization unit 106 is used for reconstructing the video coding block, reconstructing a residual block in the pixel domain, blocking artifacts is removed for the reconstructed residual block through the filter controlling and analyzing unit 107 and the filter unit 108, and then the reconstructed residual block is added to a predictive block in a frame of the decoded picture buffer unit 110 to generate a reconstructed video coding block; and the encoding unit 109 is configured to encode various coding parameters and quantized transform coefficients. In a CABAC-based coding algorithm, context contents may be based on adjacent coding blocks, and may be used for encoding information indicating the determined intra prediction mode and output a bitstream of the video signal. The decoded picture buffer unit 110 is configured to store a reconstructed video coding block for prediction reference. As video picture encoding progresses, new reconstructed video coding blocks will be generated continuously, and these reconstructed video coding blocks will be stored in the decoded picture buffer unit 110.

Figure 2B:
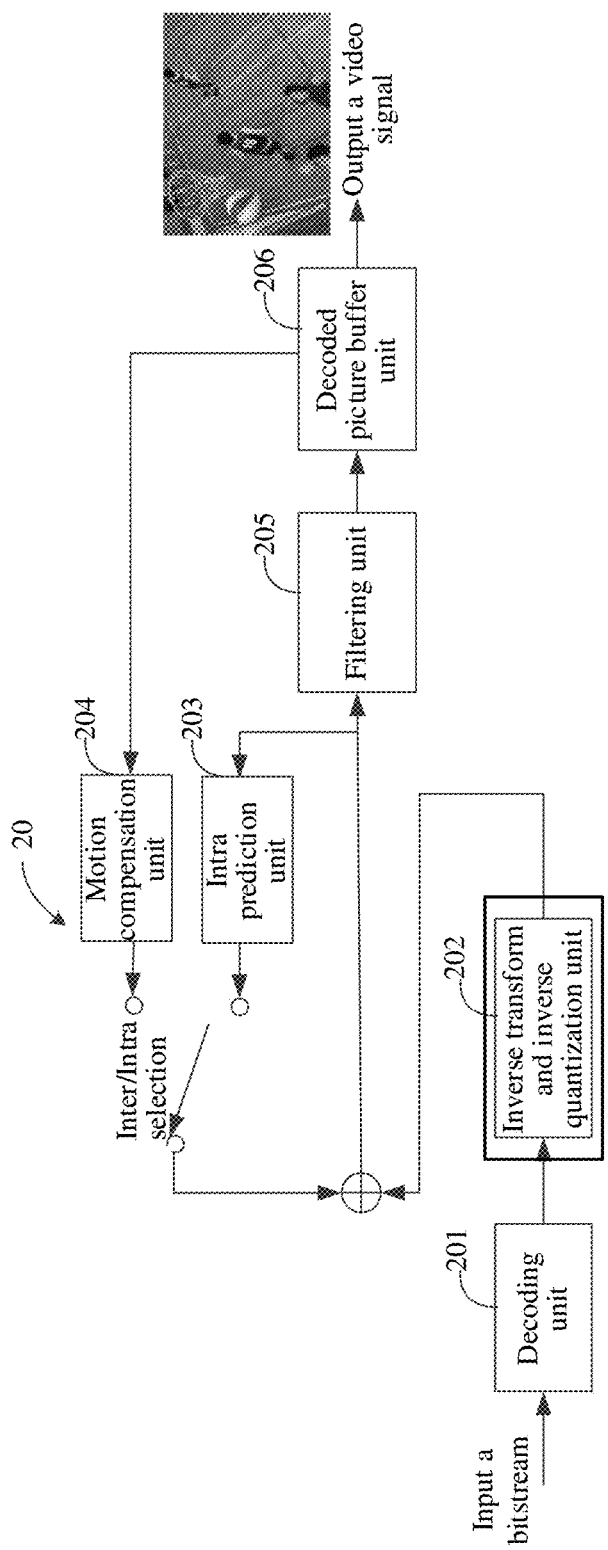
FIG. 2B is a composition block diagram of a video decoding system according to an embodiment of the present application.

Referring to FIG. 2B, which shows an exemplary composition block diagram of a video decoding system; as shown in FIG. 2B, a video decoding system 20 includes: a decoding unit 201, an inverse transform and inverse quantization unit 202, an intra prediction unit 203, a motion compensation unit 204, a filtering unit 205, and a decoded picture buffer unit 206, etc. Herein the decoding unit 201 may implement header information decoding and CABAC decoding, and the filtering unit 205 may implement deblocking filtering and SAO filtering. After the input video signal is encoded in FIG. 2A, the bitstream of the video signal is output; when the bitstream is input into the video decoding system 20, it first passes through the decoding unit 201 to obtain decoded transform coefficients; the transform coefficients are processed through the inverse transform and inverse quantization unit 202 to generate a residual block in the pixel domain; the intra prediction unit 203 may be configured to generate prediction data of a current video coding block based on the determined intra prediction mode and data from a previously coding block of a current frame or picture; the motion compensation unit 204 determines prediction information used for the video decoding block by analyzing the motion vector and other related syntax elements, and uses the prediction information to generate a predictive block of a video coding block being decoded; a decoded video block is formed by summing the residual block from the inverse transform and inverse quantization unit 202 with a corresponding predictive block generated by the intra prediction unit 203 or the motion compensation unit 204; the decoded video signal passes through the filtering unit 205 to remove blocking artifacts, which may improve video quality; then, the decoded video block is stored in the decoded picture buffer unit 206 which stores a reference picture for subsequent intra prediction or motion compensation, and which is also configured to output a video signal, thus obtaining a restored original video signal.

The transform method in the embodiment of the present application may be applied to the transform and quantization unit 101 as shown in FIG. 2A, which includes the positive primary transform unit 11 and the quantization unit 12 as shown in FIG. 1. At this time, the transform method is specifically applied to a part between transform and quantization. In addition, the transform method in the embodiment of the present application may also be applied to the inverse transform and inverse quantization unit 106 as shown in FIG. 2A or the inverse transform and inverse quantization unit 202 as shown in FIG. 2B. Both the inverse transform and inverse quantization unit 106 and the inverse transform and inverse quantization unit 202 may include the inverse quantization unit 13 and the inverse primary transform unit 14 as shown in FIG. 1. At this time, the transform method is specifically applied to a part between inverse quantization and inverse transform. That is to say, the transform method in the embodiment of the present application may be applied to both the video encoding system and the video decoding system, or may even be applied to the video encoding system and the video decoding system at the same time, which is not specifically limited in the embodiments of the present application. It should also be noted that when the transform method is applied to the video encoding system, a "current block" specifically refers to a current coding block in intra prediction; when the transform method is applied to the video decoding system, a "current block" specifically refers to a current coding block in intra prediction.

Figure 3:
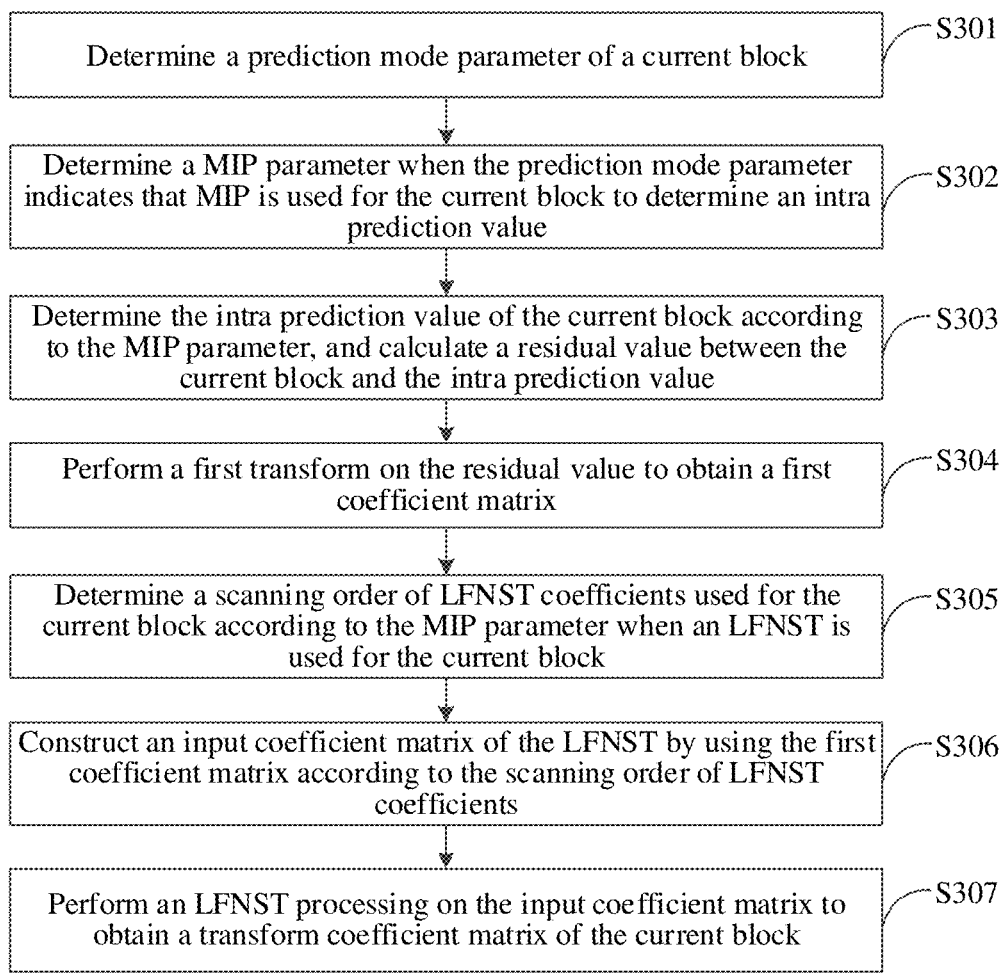
FIG. 3 is a schematic flowchart of a transform method according to an embodiment of the present application.

Based on the aforementioned application scenario example in FIG. 2A, referring to FIG. 3, which shows a schematic flowchart of a transform method according to an embodiment of the present application. As shown in FIG. 3, the method may include following acts.

S301: determining a prediction mode parameter of a current block.

It should be noted that a video picture may be partitioned into a plurality of picture blocks, and each picture block to be encoded currently may be referred as a Coding Block (CB). Herein, each coding block may include a first colour component, a second colour component, and a third colour component. While the current block is a coding block, in the video picture, of which a first colour component, a second colour component, or a third colour component is to be predicted currently.

Assuming that prediction of the first colour component is performed for the current block, and the first colour component is a luma component, that is, a colour component to be predicted is a luma component, then the current block may also be referred as a luma block. Or assuming that prediction of the second colour component is performed for the current block, and the second colour component is a chroma component, that is, a colour component to be predicted is a chroma component, then the current block may also be referred as a chroma block.

It should also be noted that the prediction mode parameter indicates a coding mode of the current block and a parameter related to the mode. The prediction mode parameter of the current block may be determined usually in a way of Rate Distortion Optimization (RDO).

Specifically, in some embodiments, for S301, the determining the prediction mode parameter of the current block may include: determining a colour component to be predicted of the current block; predicting and encoding the colour component to be predicted by using a plurality of prediction modes respectively based on a parameter of the current block, and calculating a rate distortion cost result corresponding to each of the plurality of prediction modes; and selecting a minimum rate distortion cost result from a plurality of calculated rate distortion cost results, and determining a prediction mode corresponding to the minimum rate distortion cost result as the prediction mode parameter of the current block.

That is to say, on the encoder side, for the current block, the colour component to be predicted may be encoded by using the plurality of prediction modes respectively. Herein, the plurality of prediction modes usually include a traditional intra prediction mode and a non-traditional intra prediction mode, and the traditional intra prediction mode may include a Direct Current (DC) mode, a PLANAR mode, and an angular mode, etc.; and the non-traditional intra prediction mode may include a MIP mode, a Cross-component Linear Model Prediction (CCLM) mode, an Intra Block Copy (IBC) mode, and a Palette (PLT) mode, etc.

In this way, after the current block is encoded by using the plurality of prediction modes respectively, the rate distortion cost result corresponding to each of the plurality of prediction modes may be obtained; and then the minimum rate distortion cost result is selected from the plurality of obtained rate distortion cost results, and the prediction mode corresponding to the minimum rate distortion cost result is determined as the prediction mode parameter of the current block. Thus, the current block may be encoded finally by using the determined prediction mode, and a prediction residual error may be made small in this prediction mode, so as to improve an encoding efficiency.

S302: determining a MIP parameter when the prediction mode parameter indicates that a MIP mode is used for the current block to determine an intra prediction value.

S303: determining the intra prediction value of the current block according to the MIP parameter, and calculating a residual value between the current block and the intra prediction value.

It should be noted that for the MIP mode, input data of MIP prediction include: a position of the current block (xTbCmp, yTbCmp), a MIP prediction mode (which may be represented by modeId) to which the current block is applied, a height of the current block (represented by nTbH), a width of the current block (represented by nTbW), and a transpose processing indication flag (which may be represented by isTransposed) about whether to transpose. Output data of the MIP prediction include a prediction block of the current block, in which an intra prediction value corresponding to a pixel coordinate [x][y] is predSamples [x][y]; wherein x=0, 1, . . . , nTbW−1; y=0, 1, . . . , nTbH−1.

Figure 4:
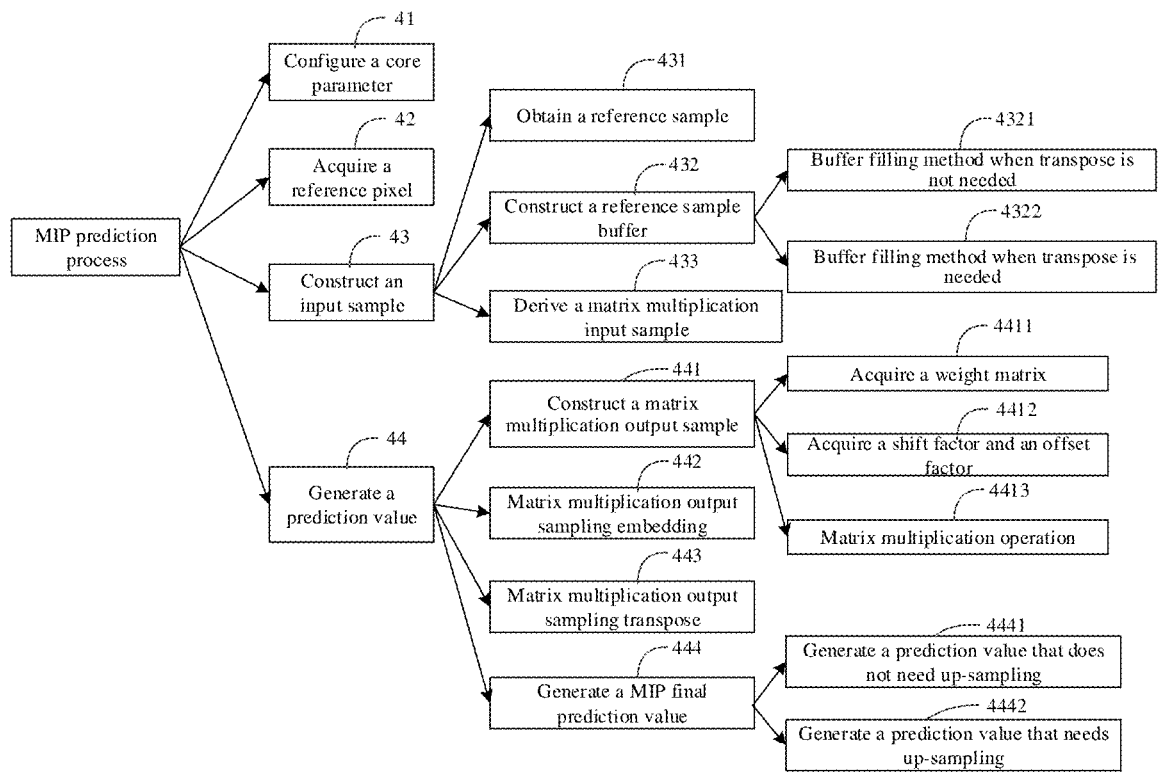
FIG. 4 is a flowchart of a MIP prediction process according to an embodiment of the present application.

Specifically, as shown in FIG. 4, a MIP prediction process may be divided into four acts: configuring a core parameter 41, acquiring a reference pixel 42, constructing input sample 43, and generating a prediction value 44. For configuring the core parameter 41, according to a size of a current block in a frame, the current block may be partitioned into three types, and a type of the current block is recorded through mipSizeId. Moreover, for different types of current blocks, a quantity of reference samples and a quantity matrix multiplication output samples are different. For acquiring the reference pixel 42, when the current block is predicted, an upper block and a left block of the current block are both coding blocks, and reference pixels of a MIP technology are reconstructed values of a previous row of pixels and a left column of pixels of the current block. A process of acquiring reference pixels adjacent to an upper side (represented by refT) and reference pixels adjacent to a left side (represented by refL) of the current block is an acquisition process of reference pixels. For constructing the input sample 43, this act is used for an input of matrix multiplication, and may mainly include: acquiring a reference sample 431, constructing a reference sample buffer 432, and deriving a matrix multiplication input sample 433; wherein, a process of acquiring the reference sample is a down-sampling process, and the constructing the reference sample buffer 432 may include a buffer filling method 4321 when no transpose is needed and a buffer filling method 4322 when transpose is needed. For generating the prediction value 44, this act is used for acquiring a MIP prediction value of the current block, and may mainly include: constructing a matrix multiplication output sampling block 441, matrix multiplication output sample embedding 442, matrix multiplication output sample transpose 443, and generating a MIP final prediction value 444; wherein, constructing the matrix multiplication output sampling block 441 may include obtaining a weight matrix 4411, obtaining a shift factor and an offset factor 4412, and matrix multiplication operation 4413, and generating the MIP final prediction value 444 may include generating a prediction value 4441 that does not need up-sampling and generating a prediction value 4442 that needs up-sampling. In this way, after these four acts, the intra prediction value of the current block may be obtained.

In this way, after the intra prediction value of the current block is determined, a difference value between a pixel true value and the intra prediction value of the current block may be calculated, and the calculated difference value may be used as a residual value, which is convenient for subsequent transform processing for the residual value.

Further, in the MIP prediction process, a MIP parameter needs to be determined.

In some embodiments, the MIP parameter may include a MIP transpose indication parameter (which may be represented by isTransposed); herein, a value of the MIP transpose indication parameter is used for indicating whether to transpose a sample input vector used in the MIP mode.

Specifically, in the MIP mode, according to reference sampling values corresponding to reference pixels adjacent to the left side of the current block and reference sampling values corresponding to reference pixels adjacent to the upper side, an adjacent reference sample set may be obtained. In this way, after the adjacent reference sample set is obtained, an input reference sampling value set, which is sample input vectors used in the MIP mode, may be constructed at this time. However, for the construction of the input reference sampling value set, there is difference between a construction method on the encoder side and a construction method on the decoder side, which is mainly related to the value of the MIP transpose indication parameter.

When applied to the encoder side, the value of the MIP transpose indication parameter may still be determined in a way of Rate Distortion Optimization, which may include specifically: calculating a first cost value with transpose and a second cost value without transpose respectively; if the first cost value is less than the second cost value, it may be determined at this time that the value of the MIP transpose indication parameter is 1; if the first cost value is not less than the second cost value, it may be determined at this time that the value of the MIP transpose indication parameter is 0.

Further, when the value of the MIP transpose indication parameter is 0, in a buffer, the reference sample values corresponding to the upper side in the adjacent reference sample set may be stored in front of the reference sample values corresponding to the left side, at this time, no transpose is needed, that is, there is no need to transpose the sample input vectors used in the MIP mode, and the buffer may be directly determined as the input reference sampling value set; when the value of the MIP transpose indication parameter is 1, in the buffer, the reference sample values corresponding to the upper side in the adjacent reference sample set may be stored behind the reference sample values corresponding to the left side. At this time, the buffer is transposed, that is, the sample input vectors used in the MIP mode need to be transposed, and then the transposed buffer is determined as the input reference sampling value set. In this way, after the input reference sampling value set is obtained, it may be used in a process of determining an intra prediction value corresponding to the current block in the MIP mode.

It should also be noted that, on the encoder side, after determining the value of the MIP transpose indication parameter, the determined value of the MIP transpose indication parameter also needs to be signalled in a bitstream, which is convenient for a subsequent parsing processing on the decoder side.

In some embodiments, the MIP parameter may also include a MIP mode index (which may be represented by modeId), wherein the MIP mode index is used for indicating the MIP mode used for the current block, and the MIP mode is used for indicating a calculation and derivation method of determining the intra prediction value of the current block by using MIP.

That is to say, in the MIP mode, since there are many kinds of MIP modes, which may be distinguished through MIP mode indices, that is, different MIP modes have different MIP mode indices. In this way, according to the calculation and derivation method of determining the intra prediction value of the current block by using MIP, a specific MIP mode may be determined, so that a corresponding MIP mode index may be obtained. In the embodiment of the present application, the MIP mode index may be 0, 1, 2, 3, 4 or 5.

In some embodiments, the MIP parameter may also include parameters such as a size and an aspect ratio of the current block; wherein, according to the size of the current block (that is, a width and a height of the current block), a type of the current block (which may be represented by mipSizeId) may also be determined.

In an embodiment, determining the type of the current block according to the size of the current block may include: if both the width and the height of the current block are equal to 4, then a value of mipSizeId may be set to 0; on the contrary, if one of the width and the height of the current block is equal to 4, or both the width and the height of the current block are equal to 8, then the value of mipSizeId may be set to 1; on the contrary, if the current block is a block of another size, the value of mipSizeId may be set to 2.

In another embodiment, determining the type of the current block according to the size of the current block may include: if both the width and the height of the current block are equal to 4, then a value of mipSizeId may be set to 0; on the contrary, if one of the width and the height of the current block is equal to 4, then the value of mipSizeId may be set to 1; on the contrary, if the current block is a block of another size, then the value of mipSizeId may be set to 2.

In this way, when using MIP to determine the intra prediction value, the MIP parameter may also be determined, which is convenient to determine an LFNST transform kernel (which may be represented by kernel) used for the current block according to the determined MIP parameter.

S304: performing a first transform on the residual value to obtain a first coefficient matrix.

S305: determining a scanning order of LFNST coefficients used for the current block according to the MIP parameter when an LFNST is used for the current block.

It should be noted that the first transform is a transform different from the LFNST, and the first coefficient matrix may be a two-dimensional primary transform coefficient matrix. In this way, after determining the residual value, the first transform is performed on the residual value to obtain the first coefficient matrix, that is, the two-dimensional primary transform coefficient matrix; then, the two-dimensional primary transform coefficient matrix will be transformed into a one-dimensional primary transform coefficient matrix through a scanning order of LFNST coefficients; then, a second transform (that is, an LFNST processing) is performed on coefficients in the one-dimensional primary transform coefficient matrix to obtain an LFNST transform coefficient matrix; finally, the LFNST transform coefficient matrix is quantized and encoded, and obtained quantized values are signalled in a video bitstream.

It should also be noted that the LFNST may not performed on any current block. Only when the current block meets following conditions simultaneously, the LFNST may be performed on the current block. These conditions include: (a) a width and a height of the current block are both greater than or equal to 4; (b) the width and the height of the current block are less than or equal to a maximum size of a transform unit; (c) a prediction mode of the current block or a coding block where the current block is located is an intra prediction mode; (d) a primary transform of the current block is a two-dimensional forward primary transform (DCT2) in both horizontal and vertical directions; (e) an intra prediction mode of the current block or a coding block where the current block is located is a non-MIP mode or a prediction mode of a transform unit is a MIP mode and a width and a height of the transform unit are both greater than or equal to 16. That is to say, for the current block in the embodiment of the present application, the aforementioned five conditions need to be met simultaneously.

Further, when it is determined that the LFNST may be performed on the current block, a scanning order of LFNST coefficients used for the current block needs to be determined. Generally speaking, scanning orders of LFNST coefficients include a horizontal scanning order and a vertical scanning order. Herein, according to a coding parameter of the current block or a coding block where the current block is located, a selected scanning order of LFNST coefficients may be implicitly derived. For example, in current H.266/VVC, according to an intra prediction mode of the current block, the selected scanning order of LFNST coefficients may be determined.

Specifically, after acquiring the intra prediction mode of the current block, a value of an intra prediction mode indicator (which may be represented by predModeIntra) may be determined, and a calculation formula is as follows.

$$\text{predModeIntra}=(cIdx==0)?\text{IntraPredModeY}[xTbY][yTbY]:\text{IntraPredModeC}[xTbY][yTbY] \quad (1)$$

A colour component indicator (which may be represented by cIdx) is used for indicating a luma component or chroma component of the current block; herein, if the luma component of the current block is predicted, then the cIdx is equal to 0; if the chroma component of the current block is predicted, then the cIdx is equal to 1. In addition, (xTbY, yTbY) is a coordinate of a sample in an upper left corner of the current block, IntraPredModeY[xTbY][yTbY] is an intra prediction mode of the luma component, and IntraPredModeC[xTbY][yTbY] is an intra prediction mode of the chroma component.

In the current H.266/VVC, intra prediction modes may be divided into a traditional intra prediction mode and a non-traditional intra prediction mode. For a non-traditional intra prediction mode, information indicated by a value of predModeIntra is as follows: if a prediction mode of a current block is a CCLM mode, the value of predModeIntra may be INTRA_LT_CCLM, INTRA_L_CCLM, or INTRA_T_CCLM (81, 82, 83 in VVC respectively); if the prediction mode of the current block is a MIP mode, the value of predModeIntra may be an index of the MIP mode used; and if the prediction mode of the current block is a traditional intra prediction mode, the value of predModeIntra may be in [0, 66].

Further, if the prediction mode of the current block is a CCLM mode and a MIP mode, the value of predModeIntra may also be set in following ways.

i. When the prediction mode of the current block is a CCLM mode, if a mode of a central luma block of a luma position corresponding to the current block (such as a chroma block) is a MIP mode, i.e. intra_mip_flag[xTbY+nTbW/2][yTbY+nTbH/2] is 1, then the value of predModeIntra is set to an index indicating a PLANAR mode (i.e. 0); otherwise, if the mode of the central luma block of the luma position corresponding to the current block (such as the chroma block) is an IBC mode or a PLT mode, the value of predModeIntra is set to an index indicating a DC mode (i.e. 1); otherwise, the value of predModeIntra is set to a value IntraPredModeY[xTbY+nTbW/2][yTbY+nTbH/2] of an index of the mode of the central luma block of the luma position corresponding to the current block (such as the chroma block).

ii. When the prediction mode of the current block is a MIP mode, the value of predModeIntra may be directly set to an index indicating a PLANAR mode (i.e. 0).

For a traditional intra prediction mode (such as wide-angle mapping), wide-angle mapping may be performed according to a size of a current block, and a traditional intra prediction mode [0, 66] may be extended to [−14, 80]; a specific mapping process is as follows.

First, an aspect ratio factor (which may be represented by whRatio) is calculated, as shown below.

$$whRatio=\text{Abs}(\text{Log }2(nTbW/nTbH)) \quad (2)$$

For a current block that is not square (that is, nTbW is not equal to nTbH), following correction may be made to predModeIntra at this time: if the nTbW is greater than the nTbH, the predModeIntra is greater than or equal to 2, and the predModeIntra is less than ((whRatio>1?(8+2×whRatio):8)), then the predModeIntra=(predModeIntra+65); otherwise, if the nTbW is less than the nTbH, and the predModeIntra is less than or equal to 66, and the predModeIntra is greater than ((whRatio>1?(60−2×whRatio):60)), then the predModeIntra=(predModeIntra−67).

In the current H.266/VVC, a scanning order of LFNST coefficients may be determined according to a value of predModeIntra. Specifically, if the value of the predModeIntra is less than or equal to 34, elements in v[j] may be correspondingly filled into d'[x][y] according to a horizontal scanning order (raster scanning). The elements filled in d'[x][y] are as follows.

$$d'[x][y]=(y<4)?v[x+(y<<\text{Log }2LfnstSize)]:((x<4)?v[32+x+((y-4)<<2)]:d[x][y]) \quad (3)$$

Figure 5A:
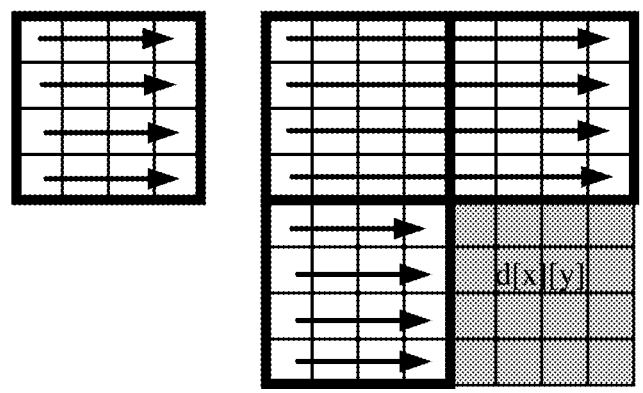
FIG. 5A is a schematic diagram of a structure of a horizontal scanning order according to an embodiment of the present application.

Herein, when nLfnstSize is 8, at this time, the elements in v[j] are not correspondingly filled into a sub-block of 4×4 in a lower right corner of d'[ ][ ], and coefficients after inverse quantization are still filled in this sub-block, that is, a value filled in this part should be 0, as shown in FIG. 5A. In FIG. 5A, the sub-block of 4×4 in the lower right corner is filled with gray, and coefficients after inverse quantization are still filled in the part filled with gray, that is, a value filled in this part should be 0.

On the contrary, if the value of the predModeIntra is greater than 34, elements in v[j] may be correspondingly filled into d'[x][y] according to a vertical scanning order (that is, a transpose order of raster scanning). The elements filled in d'[x][y] are as follows.

$$d'[x][y]=(x<4)?v[y+(x<<\text{Log }2LfnstSize)]:((y<4)?v[32+y+((x-4)<<2)]:d[x][y]) \quad (4)$$

Figure 5B:
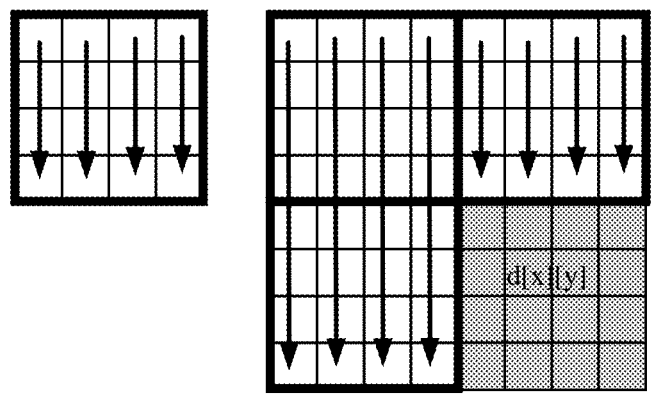
FIG. 5B is a schematic diagram of a structure of a vertical scanning order according to an embodiment of the present application.

Herein, when nLfnstSize is 8, at this time, the elements in v[j] are not correspondingly filled into a sub-block of 4×4 in a lower right corner of d'[ ][ ], and coefficients after inverse quantization are still filled in this sub-block, that is, a value filled in this part should be 0, as shown in FIG. 5B. In FIG. 5B, the sub-block of 4×4 in the lower right corner is filled with gray, and coefficients after inverse quantization are still filled in the part filled with gray, that is, a value filled in this part should be 0.

In the current H.266/VVC, for a MIP mode, since a value of predModeIntra is set to an index indicating a PLANAR mode (i.e. 0), only a horizontal scanning order may be selected for a scanning order used for a current block in the MIP mode, which results in a lack of variability when an LFNST is performed in the MIP mode, reducing an encoding efficiency. In an embodiment of the present application, a scanning order of LFNST coefficients used for a current block may be determined in combination with a MIP parameter. At this time, a horizontal scanning order may be selected, and a vertical scanning order may also be selected, so that there is variability when an LFNST is performed in a MIP mode, which may improve an encoding efficiency.

Herein, the MIP parameter may include a MIP transpose indication parameter (which may be represented by isTransposed), a MIP mode index (which may be represented by modeId), a size of a current block, a type of a current block (which may be represented by mipSizeId), and other parameters. The following will describe in detail how to select a scanning order of LFNST coefficients used for a current block according to a MIP parameter.

Optionally, in some embodiments, when the MIP parameter is a MIP transpose indication parameter, for S305, when an LFNST is used for the current block, the determining the scanning order of LFNST coefficients used for the current block according to the MIP parameter may include: setting the scanning order of LFNST coefficients to a vertical scanning order when a value of the MIP transpose indication parameter indicates that a sample input vector used in a MIP mode is to be transposed; and setting the scanning order of LFNST coefficients to a horizontal scanning order when a value of the MIP transpose indication parameter indicates that a sample input vector used in a MIP mode is not to be transposed.

Optionally, in some embodiments, when the MIP parameter is a MIP transpose indication parameter, for S305, when an LFNST is used for the current block, the determining the scanning order of LFNST coefficients used for the current block according to the MIP parameter may include: setting the scanning order of LFNST coefficients to a vertical scanning order when a value of the MIP transpose indication parameter indicates that a sample input vector used in a MIP mode is to be transposed; and setting the scanning order of LFNST coefficients to a horizontal scanning order when a value of the MIP transpose indication parameter indicates that a sample input vector used in a MIP mode is not to be transposed.

It should be noted that, since the value of the MIP transpose indication parameter is used for indicating whether to perform the transpose processing on the sample input vector used in the MIP mode, and the scanning order of LFNST coefficients includes the horizontal scanning order and the vertical scanning order, the scanning order of LFNST coefficients used for the current block may be selected through the value of the MIP transpose indication parameter.

In an embodiment, when the value of the MIP transpose indication parameter is equal to 1, that is, when the value of the MIP transpose indication parameter indicates that the sample input vector used in the MIP mode is to be transposed, at this time the scanning order of LFNST coefficients may be set to the vertical scanning order. When the value of MIP transpose indication parameter is equal to 0, that is, the value of MIP transpose indication parameter indicates that the sample input vector used in the MIP mode is not to be transposed, at this time the scanning order of LFNST coefficients may be set to the horizontal scanning order.

In another embodiment, when the value of the MIP transpose indication parameter is equal to 1, that is, when the value of the MIP transpose indication parameter indicates that the sample input vector used in the MIP mode is to be transposed, at this time the scanning order of LFNST coefficients may be set to the horizontal scanning order. When the value of MIP transpose indication parameter is equal to 0, that is, the value of MIP transpose indication parameter indicates that the sample input vector used in MIP mode is not to be transposed, at this time the scanning order of LFNST coefficients may be set to the vertical scanning order.

Optionally, in some embodiments, when the MIP parameter is a MIP mode index, for S305, when the LFNST is used for the current block, the determining the scanning order of LFNST coefficients used for the current block according to the MIP parameter may include: determining a value of an LFNST intra prediction mode index according to a value of the MIP mode index; and setting the scanning order of LFNST coefficients to a preset scanning order of LFNST coefficients corresponding to the value of the LFNST intra prediction mode index.

It should be noted that the MIP mode index is used for indicating a MIP mode used for the current block, and the MIP mode is used for indicating a calculation and derivation method of determining the intra prediction value of the current block by using MIP; that is, the scanning order of LFNST coefficients may also be determined according to the MIP mode index.

It should also be noted that after the MIP mode index is determined, the MIP mode index may also be transformed into a value of an LFNST intra prediction mode index (which may be represented by predModeIntra); then, according to the value of predModeIntra, the scanning order of LFNST coefficients is determined, such as the horizontal scanning order or the vertical scanning order.

Optionally, in some embodiments, when the MIP parameter is a MIP mode index and a MIP transpose indication parameter, for S305, when the LFNST is used for the current block, the determining the scanning order of LFNST coefficients used for the current block according to the MIP parameter may include: determining a value of an LFNST intra prediction mode index according to a value of the MIP mode index; and setting the scanning order of LFNST coefficients to a preset scanning order of LFNST coefficients corresponding to the value of the LFNST intra prediction mode index; when a value of the MIP transpose indication parameter indicates that a sample input vector used in a MIP mode is to be transposed, the method further includes: setting the scanning order of LFNST coefficients used for the current block to a vertical scanning order if the scanning order of LFNST coefficients used for the current block is a horizontal scanning order; and setting the scanning order of LFNST coefficients used for the current block to a horizontal scanning order if the scanning order of LFNST coefficients used for the current block is a vertical scanning order.

It should be noted that the MIP mode index is used for indicating a MIP mode used for the current block, the MIP mode is used for indicating a calculation and derivation method of determining the intra prediction value of the current block by using MIP; and the value of the MIP transpose indication parameter is used for indicating whether to transpose the sample input vector used in the MIP mode; that is, the scanning order of LFNST coefficients may also be determined according to a combination of the MIP transpose indication parameter and the MIP mode index.

Specifically, according to different MIP mode indices, in some MIP modes, if the value of the MIP transpose indication parameter is equal to 0, then the scanning order of LFNST coefficients used for the current block may be set to the horizontal scanning order; if the value of the MIP transpose indication parameter is equal to 1, then the scanning order of LFNST coefficients used for the current block may be set to the vertical scanning order; or, in some MIP modes, if the value of the MIP transpose indication parameter is equal to 0, then the scanning order of LFNST coefficients used for the current block may be set to the vertical scanning order; if the value of the MIP transpose indication parameter is equal to 1, then the scanning order of LFNST coefficients used for the current block may be set to the horizontal scanning order, which is not specifically limited in the embodiments of the present application.

In this way, when the MIP mode index is determined, the MIP mode index may also be transformed into the value of the LFNST intra prediction mode index (which may be represented by predModeIntra), and then the scanning order of LFNST coefficients used for the current block may be determined according to the value of predModeIntra; when the value of the MIP transpose indication parameter indicates that the sample input vector used in the MIP mode is to be transposed, at this time if the scanning order of LFNST coefficients used for the current block is the horizontal scanning order, then the scanning order of LFNST coefficients used for the current block may be set to the vertical scanning order; if the scanning order of LFNST coefficients used for the current block is the vertical scanning order, then the scanning order of LFNST coefficients used for the current block may be set to the horizontal scanning order.

It should also be noted that, for the aforementioned methods of selecting an LFNST transform kernel used for the current block, experimental results show that the determined scanning order of LFNST coefficients according to the combination of the MIP transpose indication parameter and the MIP mode index has the best performance.

Further, when the MIP parameter at least includes a MIP mode index (modeId), in a process of selecting a scanning order of LFNST coefficients used for the current block, a value of an LFNST intra prediction mode index may also be obtained by looking up a table.

Specifically, in some embodiments, the determining the value of the LFNST intra prediction mode index according to the value of the MIP mode index may include: determining the value of the LFNST intra prediction mode index corresponding to the value of the MIP mode index by using a first look-up table, wherein the first look-up table contains at least two LFNST intra prediction mode indices with different values, each of the at least two LFNST intra prediction mode indices corresponding to one or more different MIP mode indices.

Herein, the first look-up table (Look-Up Table1, abbreviated as LUT1) is used for reflecting a corresponding relationship between a MIP mode index and an LFNST intra prediction mode index, that is, the first look-up table contains at least two LFNST intra prediction mode indices with different values, each of the at least two LFNST intra prediction mode indices corresponding to one or more different MIP mode indices.

That is to say, different MIP modes may correspond to different values of predModeIntra; in this way, a MIP mode index is determined according to a MIP mode, and then a value of predModeIntra is determined according to the first look-up table; then a scanning order of LFNST coefficients used for the current block is determined according to the value of predModeIntra.

Further, the scanning order of LFNST coefficients may also be directly determined according to the value of the MIP mode index, at this time, the value of predModeIntra is no longer needed to be used, that is, the MIP mode index is no longer needed to be used for determining the value of the LFNST intra prediction mode index.

In some embodiments, when the LFNST is use for the current block, the determining the scanning order of LFNST coefficients used for the current block according to the MIP parameter may include: setting the scanning order of LFNST coefficients as a preset scanning order of LFNST coefficients corresponding to a value of the MIP mode index.

Optionally, in some embodiments, the method may further include: determining a scanning order of LFNST coefficients corresponding to a value of the MIP mode index by using a second look-up table; wherein, the second look-up table at least contains different scanning orders of LFNST coefficients, each of the different scanning orders of LFNST coefficients corresponding to one or more different MIP mode indices.

Optionally, in some embodiments, the method may further include: setting the scanning order of LFNST coefficients to a horizontal scanning order when a value of the MIP mode index is in a preset range of one or more integers; and setting the scanning order of LFNST coefficients to a vertical scanning order when a value of the MIP mode index is not in the preset range of one or more integers.

It should be noted that if a prediction mode used for the current block is a MIP mode, a selected scanning order of LFNST coefficients may be determined according to a value of a MIP mode index (modeId). Herein, the value of the MIP mode index may include 0, 1, 2, 3, 4, and 5.

In an embodiment, when the value of the MIP mode index is 0, the scanning order of LFNST coefficients may be set to a horizontal scanning order; when the value of the MIP mode index is 1, the scanning order of LFNST coefficients may be set to a vertical scanning order; when the value of the MIP mode index is 2, the scanning order of LFNST coefficients may be set to a horizontal scanning order; when the value of the MIP mode index is 3, the scanning order of LFNST coefficients may be set to a vertical scanning order, etc., which is not specifically limited in the embodiments of the present application.

In another embodiment, when the value of the MIP mode index meets a preset range of integers, for example, the value of the MIP mode index may be 0, 1, and 2, and the scanning order of LFNST coefficients may be set to the horizontal scanning order; when the value of the MIP mode index does not meet a preset range of integers, for example, the value of the MIP mode index may be 3, 4, and 5, the scanning order of LFNST coefficients may be set to the vertical scanning order, etc., which is not specifically limited in the embodiments of the present application.

In addition, if the prediction mode of the current block is the MIP mode, the scanning order of LFNST coefficients may be selected according to one or more combinations of information in the MIP parameter; it is also possible to perform mapping with a traditional intra prediction mode according to the MIP parameter, and then the scanning order of LFNST coefficients may be selected according to a mapped angle.

Further, in some embodiments, when the prediction mode parameter indicates that a non-MIP mode is used for the current block, the method may further include: determining a value of predModeIntra based on the intra prediction mode; setting the scanning order of LFNST coefficients used for the current block to a horizontal scanning order if the value of predModeIntra is less than or equal to 34; and setting the scanning order of LFNST coefficients used for the current block to a vertical scanning order if the value of predModeIntra is greater than 34.

That is to say, if the prediction mode of the current block is a non-MIP mode, then the value of predModeIntra may be determined according to the intra prediction mode; then the scanning order of LFNST coefficients used for the current block is determined according to the value of predModeIntra.

It should also be noted that when the LFNST is used for the current block, the method may further include: setting a value of an LFNST index to a value corresponding to indicating use of the LFNST, and signalling the value of the LFNST index in a video bitstream.

In this way, on the encoder side, if the LFNST is used for the current block, then the value of the LFNST index may be set to the value corresponding to indicating the use of the LFNST, and the value of the LFNST index is signalled in the video bitstream; in this way, on the decoder side, the value of the LFNST index may be obtained by parsing the bitstream, which is convenient for the decoder side to determine that the LFNST is used for the current block.

S306: constructing an input coefficient matrix of the LFNST by using the first coefficient matrix according to the scanning order of LFNST coefficients.

S307: performing an LFNST processing on the input coefficient matrix to obtain a transform coefficient matrix of the current block.

It should be noted that the scanning order of LFNST coefficients may include the horizontal scanning order and the vertical scanning order. In this way, after determining the scanning order of LFNST coefficients, the input coefficient matrix of the LFNST (i.e. a one-dimensional primary transform coefficient matrix) may be constructed by using the first coefficient matrix (i.e. a two-dimensional primary transform coefficient matrix); then, the LFNST processing is performed on the input coefficient matrix to obtain the transform coefficient matrix of the current block.

Further, the LFNST applies a Non-Separable transform based on a method of direct matrix multiplication. In order to reduce computational complexity and storage space as much as possible, a simplified Non-Separable transform technology is used in an LFNST transform. Herein, a main idea of the simplified Non-Separable transform technology is to map N-dimensional vectors to R-dimensional vectors in different spaces, wherein N/R (R<N) is a zoom factor; at this time, a transform matrix corresponding to the simplified Non-Separable transform technology is an R×N matrix, as shown below.

$$T_{R \times N} = \begin{bmatrix} t_{11} & t_{12} & t_{13} & \cdots & t_{1N} \\ t_{21} & t_{22} & t_{23} & \cdots & t_{2N} \\ \vdots & & \ddots & & \vdots \\ t_{R1} & t_{R2} & t_{R3} & \cdots & t_{RN} \end{bmatrix} \quad (5)$$

Figure 6:
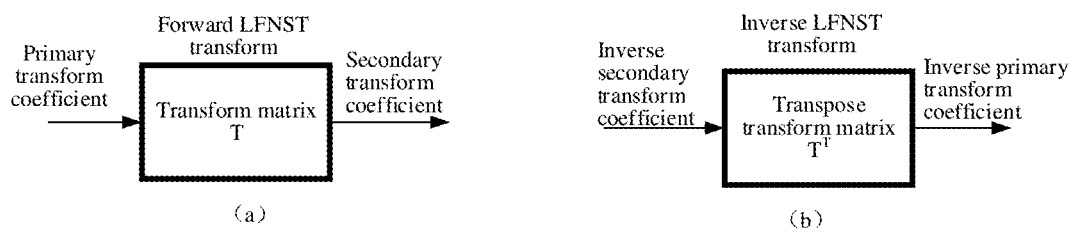
FIG. 6 is a schematic diagram of a structure of a calculation process of matrix multiplication of LFNST technology according to an embodiment of the present application.

Herein, transform matrixes used in a forward LFNST transform and an inverse LFNST transform are in a transposed relationship with each other. Referring to FIG. 6, FIG. 6 shows a schematic diagram of a structure of a calculation process of matrix multiplication of an LFNST technology according to an embodiment of the present application. As shown in FIG. 6, (a) shows a calculation process of the forward LFNST transform, and secondary transform coefficients may be obtained after primary transform coefficients pass through a transform matrix T; (b) shows a calculation process of the inverse LFNST transform; and inverse primary transform coefficients may be obtained after inverse secondary transform coefficients pass through a transposed transform matrix $T^T$.

It should also be noted that in the LFNST technology, it may be determined whether to use a 4×4 Non-Separable transform or an 8×8 Non-Separable transform according to a size of the current block. Herein, the "4×4 Non-Separable transform" may be collectively referred to as a "4×4 LFNST" and the "8×8 Non-Separable transform" may be collectively referred to as an "8×8 LFNST". Assuming that a width of the current block is nTbW and a height is nTbH, it may be concluded that if min(nTbW, nTbH)<=4, then the 4×4 LFNST may be used for the current block; otherwise, the 8×8 LFNST may be used for the current block. It should be noted that a return value of min(A, B) is the smaller of A and B.

In an embodiment, for the 4×4 LFNST, on the encoder side, 16 coefficients will be input, and 16 or 8 coefficients will be output after the forward LFNST; while on the decoder side, 16 or 8 coefficients will be input and 16 coefficients will be output. That is to say, a quantity of inputs and a quantity of outputs, for an encoder and a decoder, are just opposite.

Assuming that a size of a Transform unit (TU) may be represented by nTbW×nTbH, wherein the transform unit is a prediction residual block based on a residual value. That is, the TU may be equal to 4×4, may also be equal to 4×N or N×4 (N>4). They are described in detail below.

Figure 7A:
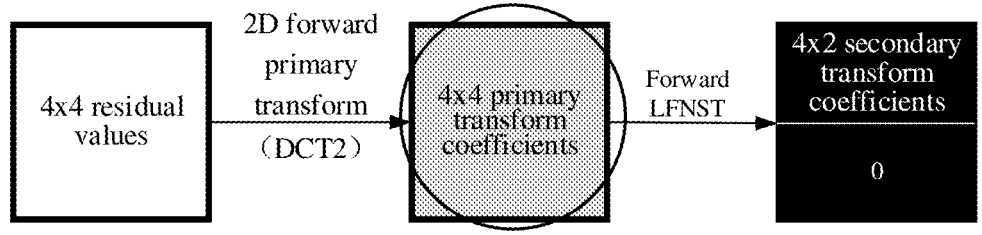
FIG. 7A is a block diagram of a structure of an LFNST transform according to a related technical solution.

When the TU is equal to 4×4, a forward LFNST process corresponding to the 4×4 transform unit is shown in FIG. 7A. In FIG. 7A, a white block is a residual value, a gray block is a primary transform coefficient, and a black block is a secondary transform coefficient. Herein, at a position exampled by "0", an encoder sets a transform coefficient to 0. For the 4×4 transform unit, when a forward LFNST is performed, a size of a transform matrix that is used is 8×16, and all 4×4 primary transform coefficients in a current transform unit are used as inputs, and outputs are 4×2 secondary transform coefficients.

Figure 7B:
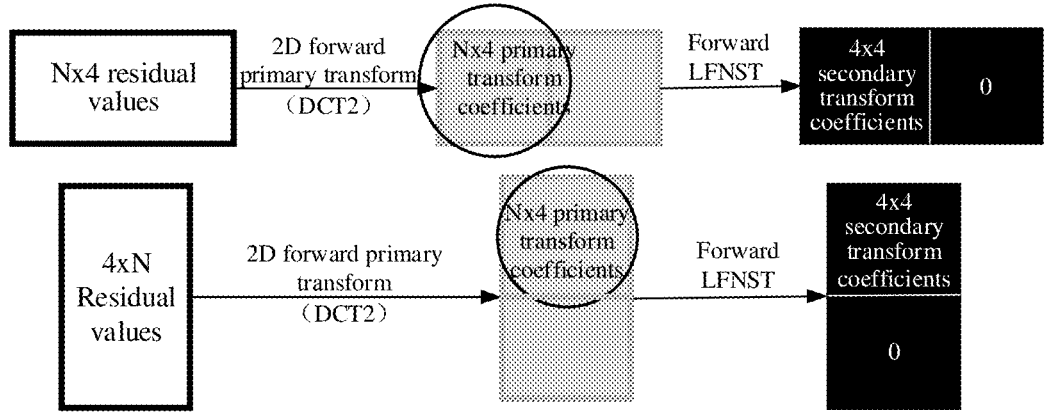
FIG. 7B is a block diagram of a structure of another LFNST transform according to a related technical solution.

When the TU is equal to 4×N or N×4 (n>4), a forward LFNST process corresponding to the 4×N or N×4 transform unit is shown in FIG. 7B. In FIG. 7B, a white block is a residual value, a gray block is a primary transform coefficient, and a black block is the secondary transform coefficient. Herein, for the 4×N or N×4 transform unit, when a forward LFNST is performed, a size of a transform matrix that is used is 16×16, and primary transform coefficients in a first 4×4 sub-block in a current transform unit (specifically, an uppermost sub-block for the 4×N transform unit and a leftmost sub-block for the N×4 transform unit) are used as inputs and outputs are 4×4 secondary transform coefficients. Herein, at a position exampled by "0", the encoder still sets a transform coefficient to 0.

In another embodiment, for an 8×8 LFNST, on the encoder side, 48 coefficients will be input, and 16 or 8 coefficients will be output after passing through a forward LFNST; on the decoder side, 16 or 8 coefficients will be input and 48 coefficients will be output. That is to say, a quantity of inputs and a quantity of outputs, for an encoder and a decoder, are just opposite.

Figure 7C:
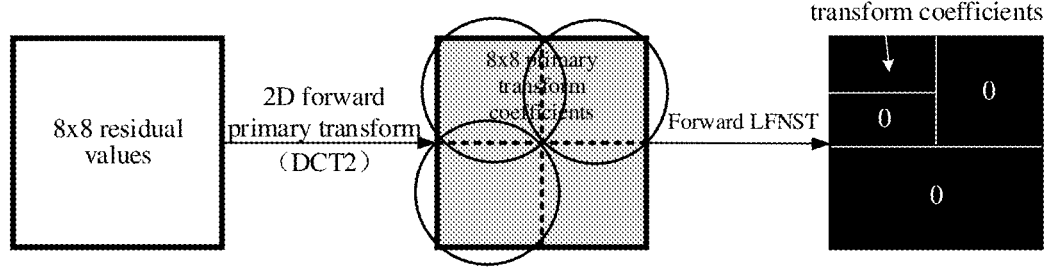
FIG. 7C is a block diagram of a structure of yet another LFNST transform according to a related technical solution.

When the TU is equal to 8×8, a forward LFNST process corresponding to the 8×8 transform unit is shown in FIG. 7C. In FIG. 7C, a white block is a residual value, a gray block is a primary transform coefficient, and a black block is a secondary transform coefficient; for the 8×8 transform unit, when a forward LFNST is performed, a size of a transform matrix that is used is 8×48; primary transform coefficients of first three 4×4 sub-blocks in a current transform unit (that is, three sub-blocks in an upper left corner) are used as inputs, and outputs are 4×2 secondary transform coefficients. Herein, at a position exampled by "0", the encoder still sets a transform coefficient to 0.

Figure 7D:
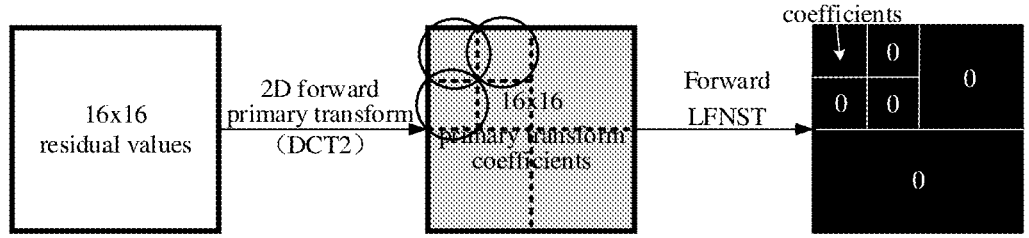
FIG. 7D is a block diagram of a structure of still another LFNST transform according to a related technical solution.

When the TU is greater than 8×8, a forward LFNST process corresponding to a transform unit greater than 8×8 is shown in FIG. 7D. In FIG. 7D, a white block is a residual value, a gray block is a primary transform coefficient, and a black block is the secondary transform coefficient; for the transform unit greater than 8×8, when a forward LFNST is performed, a size of a transform matrix that is used is 48×16, and primary transform coefficients in first three 4×4 sub-blocks in a current transform unit (that is, three sub-blocks in an upper left corner) are used as inputs, and outputs are 4×4 secondary transform coefficients. Herein, at a position exampled by "0", the encoder still sets a transform coefficient to 0.

In this way, no matter whether a TU corresponding to a residual value is 4×4, 4×N, or N×4 (N>4), or 8×8, or even greater than 8×8, at this time, related processing such as a primary transform and a secondary transform of an LFNST on the residual value may be implemented according to FIG. 7A or FIG. 7B or FIG. 7C or FIG. 7D.

In an embodiment of the present application, applicability of an LFNST technology to a current block using a MIP mode may be improved, making selection of a scanning order more flexible. When an LFNST is performed on the current block using the MIP mode, related information of a MIP parameter is introduced, and characteristics of the current block are determined according to this MIP information, and then the scanning order is selected. For example, this transform method is applied to VTM 7.0, and is tested under an All Intra condition at 24-frame intervals. Based on an average bit rate change under a same Peak Signal to Noise Ratio (PSNR), a Bjontegaard-Delta rate (BD-rate) changes of −0.03%, 0.00%, and −0.01% may be obtained on three colour components (i.e. Y, Cb, and Cr) respectively. Especially in a high-resolution sequence, it will have better performance. Specifically, in Class A1, a BD-rate change of −0.10% in Y may be achieved, thus improving an encoding efficiency.

In this embodiment, the transform method is provided, which is applied to the encoder. Following acts are included: determining a prediction mode parameter of a current block; determining a MIP parameter when the prediction mode parameter indicates that MIP is used for the current block to determine an intra prediction value; according to the MIP parameter, determining the intra prediction value of the current block, and calculating a residual value between the current block and the intra prediction value; performing a first transform on the residual value to obtain a first coefficient matrix; determining a scanning order of LFNST coefficients used for the current block according to the MIP parameter when an LFNST is used for the current block; according to the scanning order of LFNST coefficients, constructing an input coefficient matrix of the LFNST by using the first coefficient matrix; and performing an LFNST processing on the input coefficient matrix to obtain a transform coefficient matrix of the current block; wherein, the first transform is a transform different from the LFNST, and scanning orders of LFNST coefficients include a horizontal scanning order and a vertical scanning order. In this way, for the current block using the MIP mode, since the MIP parameter is introduced during an LFNST transform, selection of the scanning order of LFNST coefficients is more flexible, thus not only improving applicability of an LFNST technology to a non-traditional intra prediction mode, but also improving an encoding efficiency and video picture quality.

Figure 8:
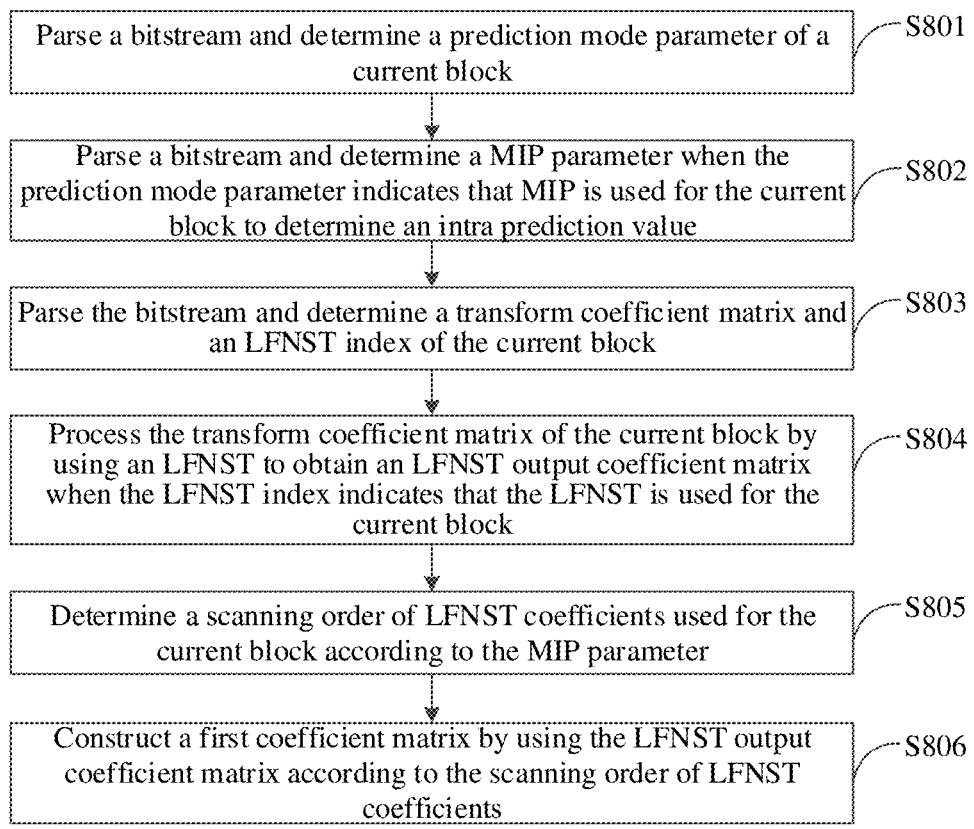
FIG. 8 is a schematic flowchart of another transform method according to an embodiment of the present application.

Based on the aforementioned application scenario example in FIG. 2B, referring to FIG. 8, FIG. 8 shows a schematic flowchart of another transform method according to an embodiment of the present application. As shown in FIG. 8, the method may include following acts.

S801: parsing a bitstream and determining a prediction mode parameter of a current block.

It should be noted that the prediction mode parameter indicates a coding mode of the current block and a parameter related to the mode. Prediction modes usually include a traditional intra prediction mode and a non-traditional intra prediction mode, while the traditional intra prediction mode may include a DC mode, a PLANAR mode, and an angular mode, etc.; and the non-traditional intra prediction mode may include a MIP mode, a CCLM mode, an IBC mode, and a PLT mode, etc.

It should also be noted that on the encoder side, prediction and coding will be performed for the current block, and in this process, a prediction mode of the current block may be determined, and a corresponding prediction mode parameter is signalled in a bitstream, which is transmitted by an encoder to a decoder.

On the decoder side, an intra prediction mode of a luma component or a chroma component of the current block or a coding block where the current block is located may be obtained by parsing the bitstream, and a value of predModeIntra may be determined at this time, and a calculation formula is the same as the aforementioned formula (1).

in the formula (1), a colour component indicator (which may be represented by cIdx) is used for indicating the luma component or chroma component of the current block; herein, if the luma component of the current block is predicted, then the cIdx is equal to 0; if the chroma component of the current block is predicted, then the cIdx is equal to 1. In addition, (xTbY, yTbY) is a coordinate of a sample in an upper left corner of the current block, IntraPredModeY[xTbY][yTbY] is an intra prediction mode of the luma component, and IntraPredModeC [xTbY][yTbY] is an intra prediction mode of the chroma component.

S802: parsing the bitstream and determining a MIP parameter when the prediction mode parameter indicates that MIP is used for the current block to determine an intra prediction value.

It should be noted that the MIP parameter may include a MIP transpose indication parameter (which may be represented by isTransposed), a MIP mode index (which may be represented by modeId), a size of a current block, a type of a current block (which may be represented by mipSizeId), and other parameters; values of these parameters may be obtained by parsing the bitstream.

In some embodiments, by parsing the bitstream, a value of isTransposed may be determined; when the value of the isTransposed is 1, a sample input vector used in a MIP mode needs to be transposed; when the value of isTransposed is 0, a sample input vector used in a MIP mode does not need to be transposed; that is to say, the MIP transpose indication parameter may be used for indicating whether to transpose the sample input vector used in the MIP mode.

In some embodiments, a MIP mode index (which may be represented by modeId) may also be determined by parsing the bitstream, wherein MIP mode index may be used for indicating a MIP mode used for the current block, and the MIP mode may be used for indicating a calculation and derivation method of determining an intra prediction value of the current block by using MIP. That is to say, different MIP modes correspond to different values of MIP mode indices; herein, a value of the MIP mode index may be 0, 1, 2, 3, 4, or 5.

In some embodiments, by parsing the bitstream, parameter information such as a size of the current block, an aspect ratio, a type of the current block (which may be represented by mipSizeId) may also be determined. In this way, after the MIP parameter is determined, it is convenient to select a scanning order of LFNST coefficients used for the current block according to the determined MIP parameter.

S803: parsing the bitstream and determining a transform coefficient matrix and an LFNST index of the current block.

It should be noted that a value of the LFNST index may be used for indicating whether an LFNST is used for the current block. Specifically, after parsing out the LFNST index, when the value of the LFNST index is equal to 0, it indicates that the LFNST is not used for the current block;

when the value of the LFNST index is greater than 0, it indicates that the LFNST is used for the current block, at this time the transform coefficient matrix of the current block may be processed by using the LFNST.

S804: processing the transform coefficient matrix of the current block by using an LFNST to obtain an LFNST output coefficient matrix when the LFNST index indicates that the LFNST is used for the current block.

it should be noted that, on the decoder side, input data of the LFNST may include: a luma position (xTbY, yTbY) of a current transform unit, a width nTbW of a current block, a height nTbH of the current block, whether the current block is a luma component or a chroma component cIdx, and coefficients d[x][y] of the current transform unit after scaling, x=0, 1, . . . , nTbW−1, y=0, 1, . . . , nTbH−1; output data of the LFNST may include: primary transform coefficients d'[x][y] generated by secondary transform coefficients after the LFNST, x=0, 1, . . . , nLfnstSize−1, y=0, 1, . . . , nLfnstSize−1.

Figure 9:
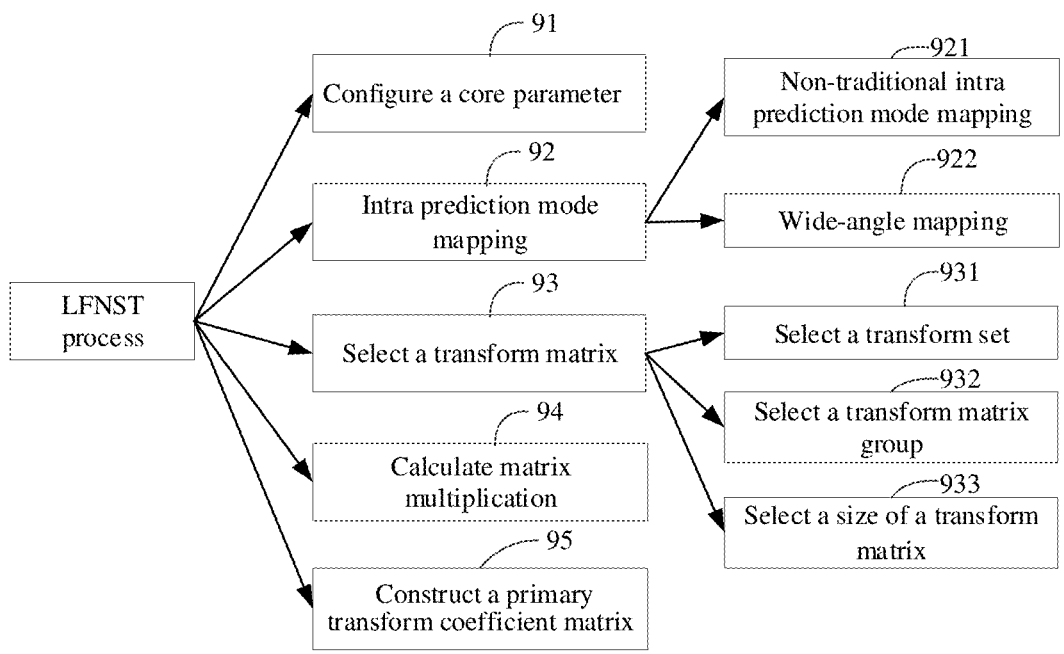
FIG. 9 is a flowchart of a specific process of an LFNST according to an embodiment of the present application.

Specifically, as shown in FIG. 9, a specific process of an LFNST may be divided into four acts: configuring a core parameter 91, intra prediction mode mapping 92, selecting a transform matrix 93, calculating matrix multiplication 94, and constructing a primary transform coefficient matrix 95. For the intra prediction mode mapping 92, this act is used for determining a value of predModeIntra, and may mainly include: non-traditional intra prediction mode mapping 921 and wide-angle mapping 922; for the selecting the transform matrix 93, this act is used for selecting a transform set and a transform matrix, and may mainly include: selecting a transform set 931, selecting a transform matrix group 932, and selecting a size of a transform matrix 933.

For the configuring the core parameter 91, a length of an input secondary transform coefficient vector (which may be represented by nonZeroSize) and a length of an output primary transform coefficient vector (which may be represented by nLfnstOutSzie) for LFNST calculation need to be configured first. Values for nonZeroSize and nLfnstOutSzie are shown in Table 1.

TABLE 1

| size of a Transform Unit | nonZeroSize | nLfnstOutSzie |
|---|---|---|
| 4 × 4 | 8 | 16 |
| 4 × N or N × 4 (N > 4) | 16 | 16 |
| 8 × 8 | 8 | 48 |
| >8 × 8 | 16 | 48 |

In the current H.266/VVC, configurations of parameters such as nonZeroSize and nLfnstOutSzie are calculated through formulas as follows.

$$nLfnstOutSize=(nTbW>=8\&\&nTbH>=8)?48:16 \qquad (6)$$

$$nonZeroSize=(nTbW==4\&\&nTbH==4)||(nTbW==8\&\&nTbH==8)?8:16 \qquad (7)$$

In addition, a parameter nLfnstSize needs to be configured, which means that there will be a primary transform coefficient only within a first nLfnstSize×nLfnstSize range in the current block, and a value of nLfnstSize is as follows.

$$\text{Log }2LfnstSize=(nTbW>=8\&\&nTbH>=8)?3:2 \qquad (8)$$

$$nLfnstSize=1<<\text{Log }2LfnstSize \qquad (9)$$

At this time, an intra prediction mode of the luma component or the chroma component of the current block or the coding block where the current block is located may also be obtained by parsing the bitstream, and a value of predModeIntra may be determined at this time, and a calculation formula is the same as the aforementioned formula (1).

Further, a vector u[i] (i=0, 1, . . . , nonZeroSize−1) of a secondary transform coefficient is obtained, i=0, 1, . . . , nonZeroSize−1. When it is determined that an LFNST is used for a current transform unit, a coefficient d[x][y] after scaling is the secondary transform coefficient. First nonZeroSize values are acquired according to a diagonal scanning order, that is, the vector u[i](i=0, 1, . . . , nonZeroSize−1) of the secondary change coefficient. In a following formula, xC and yC are expressed as an abscissa and an ordinate of a coefficient numbered x according to a diagonal order in a current block relative to an upper left corner point, and xC and yC are as follows.

$$xC=DiagScanOrder[2][2][x][0] \qquad (10)$$

$$yC=DiagScanOrder[2][2][x][1] \qquad (11)$$

$$u[i]=d[xC][yC] \qquad (12)$$

Further, for the intra prediction mode mapping 92, intra prediction modes may be divided into a traditional intra prediction mode and a non-traditional intra prediction mode. For the non-traditional intra prediction mode, information indicated by a value of predModeIntra is as follows: if the value of predModeIntra may be INTRA_LT_CCLM, INTRA_L_CCLM, or INTRA_T_CCLM (81, 82, 83 in VVC respectively), it indicates that a prediction mode of the current block is a CCLM mode; if intra_mip_flag[xTbY][yTbY] is equal to 1 and cIdx is equal to 0, it indicates that the prediction mode of the current block is a MIP mode, and at this time the value of predModeIntra indicates a MIP mode index modeId that is used; if it is not in the above two situations, the value of predModeIntra may be in [0, 66], and it indicates that the prediction mode of the current block is a traditional intra prediction mode.

Further, by parsing the bitstream, an index of a candidate set of LFNST transform kernels is determined according to a serial number of a traditional intra prediction mode. At this time, if the prediction mode of the current block is a CCLM mode and a MIP mode, the value of predModeIntra may also be set in following ways.

i. When the value of predModeIntra indicates INTRA_LT_CCLM, INTRA_L_CCLM, or INTRA_T_CCLM (81, 82, 83 in VVC respectively), if a mode of a central luma block of a luma position corresponding to the current block (such as a chroma block) is a MIP mode, i.e. intra_mip_flag[xTbY+nTbW/2][yTbY+nTbH/2] is 1, then the value of predMode Intra is set to an index indicating a PLANAR mode (i.e. 0); otherwise, if the mode of the central luma block of the luma position corresponding to the current block (such as the chroma block) is an IBC mode or a PLT mode, the value of predModeIntra is set to an index indicating a DC mode (i.e. 1); otherwise, the value of predModeIntra is set to a value IntraPredModeY[xTbY+nTbW/2][yTbY+nTbH/2] of an index of the mode of the central luma block of the luma position corresponding to the current block (such as the chroma block).

ii. When intra_mip_flag[xTbY][yTbY] is equal to 1 and cIdx is equal to 0, that is, the prediction mode of the current block is a MIP mode, the value of predModeIntra may be directly set to an index indicating a PLANAR mode (i.e. 0).

For a traditional intra prediction mode (such as wide-angle mapping), in a process of parsing the bitstream, wide-angle mapping may be performed according to a size of the current block, and a traditional intra prediction mode [0, 66] is extended to [−14, 80]; a specific mapping process is as follows.

First, an aspect ratio factor (which may be represented by whRatio) is calculated, as shown in the aforementioned formula (2). Then, for a current block that is not square (that is, nTbW is not equal to nTbH), following correction may be made to a value of the predModeIntra: if the nTbW is greater than the nTbH, the predModeIntra is greater than or equal to 2, and the predModeIntra is less than ((whRatio>1? (8+2×whRatio):8)), then predModeIntra=(predModeIntra+65); otherwise, if the nTbW is less than the nTbH, and the predModeIntra is less than or equal to 66, and the predModeIntra is greater than ((whRatio>1?(60−2×whRatio):60)), then predmodeintra=(predmodeintra−67).

In the current H. 266/VVC, an index of a candidate set of LFNST transform kernels (which may be represented by SetIdx) may be determined, a specific value is as follows.

TABLE 2

| predModeIntra | SetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

Generally speaking, an LFNST transform set includes four candidate sets of transform kernels (set0, set1, set2, and set3), and corresponding values of SetIdx are 0, 1, 2, and 3 respectively. In this way, since a transform matrix of an LFNST is a plurality of fixed coefficient matrices obtained through training, a candidate set of LFNST transform kernels includes two groups of transform matrices (which may also be referred as LFNST transform kernels), thus after determining the candidate set of LFNST transform kernels, a group of LFNST transform kernels needs to be selected from the candidate set of LFNST transform kernels, that is, a transform matrix used when the LFNST is performed on the current block is determined.

It should also be noted that on the encoder side, a group of LFNST transform kernels may be selected through a Rate Distortion Cost (RDCost), and an index (which may be represented by lfnst_idx) corresponding to the LFNST transform kernels is signalled in a video bitstream and transmitted to the decoder side. Therefore, on the decoder side, a value of lfnst_idx may be obtained by parsing the bitstream; then, according to the value of lfnst_idx, a transform matrix (transform kernel) indicated by lfnst_idx may be selected from the candidate set of LFNST transform kernels. For example, when the value of lfnst_idx is equal to 1, a first group of LFNST transform kernels (i.e. a first group of transform matrices) in the candidate set of LFNST transform kernels is selected; when the value of lfnst_idx is equal to 2, a second group of LFNST transform kernels (that is, a second group of transform matrices) in the candidate set of LFNST transform kernels is selected.

Further, for each group of transform matrices (transform kernels), two basic transform matrices are included, and sizes of basic transform matrices used on the decoder side are 16×16 and 48×16. Selection is performed according to nLfnstOutSize, if nLfnstOutSize is 16, a basic transform matrix of 16×16 is selected; or, if nLfnstOutSize is 48, a basic transform matrix of 48×16 is selected; or, if nonZeroSize is 8, only first eight rows in a transform matrix are used for matrix multiplication.

Further, a secondary transform coefficient vector u[i] is used as input, and it is multiplied with a transform matrix to obtain a primary transform coefficient vector v[j], wherein i=0, 1, . . . , nonZeroSize−1, j=0, 1, . . . , nLfnstOutSize−1. Assuming that the transform matrix obtained in a previous act is lowFreqTransMatrix, a specific calculation process of v[j] is as follows.

$$v[j] = \text{Clip3}\left(\text{CoeffMin}, \text{CoeffMax}, \left(\sum_{j=0}^{nonZeroSize-1} lowFreqTransMatrix[j][i] \times u[i] + 64\right) \gg 7\right) \quad [13]$$

Herein, Clip3 works for embedding, and a value of a coefficient may be limited between following two numbers, as shown below.

$$\text{CoeffMin} = -(1<<15) \quad (14)$$

$$\text{CoeffMax} = (1<<15)-1 \quad (15)$$

In this way, after the aforementioned matrix calculation, a transform processing of transform coefficients may be achieved. Herein, for a 4×4 LFNST, on the decoder side, 16 or 8 coefficients will be input and 16 coefficients will be output; while for an 8×8 LFNST, on the decoder side, 16 or 8 coefficients will be input and 48 coefficients will be output, so as to achieve an LFNST transform processing of the transform coefficients, and an LFNST output coefficient matrix may be obtained.

S805: determining a scanning order of LFNST coefficients used for the current block according to the MIP parameter;

Herein, the MIP parameter may include a MIP transpose indication parameter (which may be represented by isTransposed), a MIP mode index (which may be represented by modeId), a size of a current block, a type of a current block (which may be represented by mipSizeId), and other parameters. The following will describe in detail how to select an LFNST transform kernel used for the current block according to a MIP parameter.

Optionally, in some embodiments, when the MIP parameter is a MIP transpose indication parameter, for S805, the determining the scanning order of LFNST coefficients used for the current block according to the MIP parameter may include: setting the scanning order of LFNST coefficients to a vertical scanning order when a value of the MIP transpose indication parameter indicates that a sample input vector used in a MIP mode is to be transposed; and setting the scanning order of LFNST coefficients to a horizontal scanning order when a value of the MIP transpose indication parameter indicates that a sample input vector used in a MIP mode is not to be transposed.

Optionally, in some embodiments, when the MIP parameter is a MIP transpose indication parameter, for S805, the determining the scanning order of LFNST coefficients used for the current block according to the MIP parameter may include: setting the scanning order of LFNST coefficients to a vertical scanning order when a value of the MIP transpose indication parameter indicates that a sample input vector used in a MIP mode is to be transposed; and setting the scanning order of LFNST coefficients to a horizontal scanning order when a value of the MIP transpose indication parameter indicates that a sample input vector used in a MIP mode is not to be transposed.

It should be noted that, since the value of the MIP transpose indication parameter is used for indicating whether to transpose the sample input vector used in the MIP mode, then after acquiring the value of the MIP transpose indication parameter by parsing the bitstream, the scanning order of LFNST coefficients used for the current block may be selected through the value of the MIP transpose indication parameter.

In an embodiment, when the value of the MIP transpose indication parameter is equal to 1, that is, when the value of the MIP transpose indication parameter indicates that the sample input vector used in the MIP mode is to be transposed, the scanning order of LFNST coefficients may be set to the vertical scanning order. When the value of the MIP transpose indication parameter is equal to 0, that is, the value of the MIP transpose indication parameter indicates that the sample input vector used in the MIP mode is not to be transposed, then the scanning order of LFNST coefficients may be set to the horizontal scanning order.

In another embodiment, when the value of the MIP transpose indication parameter is equal to 1, that is, when the value of the MIP transpose indication parameter indicates that the sample input vector used in the MIP mode is to be transposed, the scanning order of LFNST coefficients may be set to the horizontal scanning order. When the value of the MIP transpose indication parameter is equal to 0, that is, the value of the MIP transpose indication parameter indicates that the sample input vector used in the MIP mode is not to be transposed, then the scanning order of LFNST coefficients may be set to the vertical scanning order.

Optionally, in some embodiments, when the MIP parameter is a MIP mode index, for S805, the determining the scanning order of LFNST coefficients used for the current block according to the MIP parameter may include: according to the MIP mode index, determining a value of an LFNST intra prediction mode index; and setting the scanning order of LFNST coefficients to a preset scanning order of LFNST coefficients corresponding to the value of the LFNST intra prediction mode index.

It should be noted that the MIP mode index is used for indicating a MIP mode used for the current block, and the MIP mode is used for indicating a calculation and derivation method of determining the intra prediction value of the current block by using MIP; that is, according to the MIP mode index, the scanning order of LFNST coefficients may also be determined.

It should also be noted that after the MIP mode index is obtained by parsing the bitstream, the MIP mode index may also be transformed into the value of the LFNST intra prediction mode index (which may be represented by predModeIntra); then, according to the value of predModeIntra, the scanning order of LFNST coefficients is determined, such as a horizontal scanning order or a vertical scanning order.

Optionally, in some embodiments, when the MIP parameter is a MIP mode index and a MIP transpose indication parameter, for S805, the determining the scanning order of LFNST coefficients used for the current block according to the MIP parameter may include: according to the MIP mode index, determining a value of an LFNST intra prediction mode index; and setting the scanning order of LFNST coefficients to a preset scanning order of LFNST coefficients corresponding to the value of the LFNST intra prediction mode index; when the value of the MIP transpose indication parameter indicates that a sample input vector used in a MIP mode is to be transposed, the method further includes: if the scanning order of LFNST coefficients used for the current block is the horizontal scanning order, setting the scanning order of LFNST coefficients used for the current block to the vertical scanning order; and if the scanning order of LFNST coefficients used for the current block is the vertical scanning order, setting the scanning order of LFNST coefficients used for the current block to the horizontal scanning order.

It should be noted that the MIP mode index is used for indicating the MIP mode used for the current block, the MIP mode is used for indicating the calculation and derivation method of determining the intra prediction value of the current block by using MIP; and the value of the MIP transpose indication parameter is used for indicating whether to transpose the sample input vector used in the MIP mode; that is, the scanning order of LFNST coefficients may also be determined according to a combination of the MIP transpose indication parameter and the MIP mode index.

In this way, when the MIP mode index is acquired, after the MIP mode index is transformed into the value of the LFNST intra prediction mode index (which may be represented by predModeIntra), and then the scanning order of LFNST coefficients used for the current block may also be determined according to the value of predModeIntra; when the value of the MIP transpose indication parameter indicates that the sample input vector used in the MIP mode is to be transposed, at this time if the scanning order of LFNST coefficients used for the current block is the horizontal scanning order, then the scanning order of LFNST coefficients used for the current block may be set to the vertical scanning order; if the scanning order of LFNST coefficients used for the current block is the vertical scanning order, then the scanning order of LFNST coefficients used for the current block may be set to the horizontal scanning order.

It should also be noted that, for the aforementioned methods of selecting the LFNST transform kernel used for the current block, experimental results show that the scanning order of LFNST coefficients determined according to the combination of the MIP transpose indication parameter and the MIP mode index has the best performance.

Further, when the MIP parameter at least include the MIP mode index (modeId), in a process of selecting the scanning order of LFNST coefficients used for the current block, the value of the LFNST intra prediction mode index may also be obtained by looking up a table.

Specifically, in some embodiments, the determining the value of the LFNST intra prediction mode index according to the value of the MIP mode index may include: determining the value of the LFNST intra prediction mode index corresponding to the value of the MIP mode index by using a first look-up table, wherein the first look-up table contains at least two LFNST intra prediction mode indices with different values, each of the at least two LFNST intra prediction mode indices corresponding to one or more different MIP mode indices.

Herein, the first look-up table (Look-Up Table1, abbreviated as LUT1) is used for reflecting a corresponding relationship between the MIP mode index and the LFNST intra prediction mode index, that is, the first look-up table contains at least two LFNST intra prediction mode indices with different values, each of the at least two LFNST intra prediction mode indices corresponding to one or more different MIP mode indices.

That is to say, different MIP modes may correspond to different values of predModeIntra; in this way, the MIP mode index is determined according to the MIP mode, and then the value of predModeIntra is determined according to the first look-up table; then, according to the value of predModeIntra, the scanning order of LFNST coefficients used for the current block is determined.

Further, the scanning order of LFNST coefficients may also be directly determined according to the value of the MIP mode index, at this time, the value of predModeIntra is no longer needed to be used, that is, the MIP mode index is no longer needed to be used for determining the value of the LFNST intra prediction mode index.

In some embodiments, when the LFNST is used for the current block, the determining the scanning order of LFNST coefficients used for the current block according to the MIP parameter may include: setting the scanning order of LFNST coefficients to a preset scanning order of LFNST coefficients corresponding to the value of the MIP mode index.

Optionally, in some embodiments, the method may further include: determining the scanning order of LFNST coefficients corresponding to the value of the MIP mode index by using a second look-up table; wherein, the second look-up table at least contains different scanning orders of LFNST coefficients, each of the different scanning orders of LFNST coefficients corresponding to one or more different MIP mode indices.

Optionally, in some embodiments, the method may further include: setting the scanning order of LFNST coefficients to the horizontal scanning order when the value of the MIP mode index is in a preset range of one or more integers; and setting the scanning order of LFNST coefficients to the vertical scanning order when the value of the MIP mode index is not in the preset range of one or more integers.

It should be noted that if the prediction mode used for the current block is the MIP mode, the selected scanning order of LFNST coefficients may be determined according to the value of the MIP mode index (modeId). Herein, the value of the MIP mode index may include 0, 1, 2, 3, 4, and 5.

In an embodiment, when the value of the MIP mode index is 0, the scanning order of LFNST coefficients may be set to the horizontal scanning order; when the value of the MIP mode index is 1, the scanning order of LFNST coefficients may be set to the vertical scanning order; when the value of the MIP mode index is 2, the scanning order of LFNST coefficients may be set to the horizontal scanning order; when the value of the MIP mode index is 3, the scanning order of LFNST coefficients may be set to the vertical scanning order, etc., which is not specifically limited in the embodiments of the present application.

In another embodiment, when the value of the MIP mode index meets a preset range of integers, for example, the value of the MIP mode index may be 0, 1, or 2, and the scanning order of LFNST coefficients may be set to the horizontal scanning order; when the value of the MIP mode index does not meet the preset range of integers, for example, the value of the MIP mode index may be 3, 4, or 5, the scanning order of LFNST coefficients may be set to the vertical scanning order, etc., which is not specifically limited in the embodiments of the present application.

In addition, if the prediction mode of the current block is the MIP mode, the scanning order of LFNST coefficients may be selected according to one or more combinations of information in the MIP parameter; it is also possible to perform mapping with a traditional intra prediction mode according to the MIP parameter, and then the scanning order of LFNST coefficients is selected according to a mapped angle.

It should also be noted that if the prediction mode of the current block is the MIP mode, the scanning order of LFNST coefficients may also be selected according to one or more combinations of information in the MIP parameter; it is also possible to perform mapping with a traditional intra prediction mode according to the MIP parameter, and then the scanning order of LFNST coefficients is selected according to a mapped angle, which is not limited specifically in the embodiments of the present application.

Further, in some embodiments, when the prediction mode parameter indicates that a non-MIP mode is used for the current block, the method may further include: determining a value of predModeIntra based on the intra prediction mode; if the value of predModeIntra is less than or equal to 34, setting the scanning order of LFNST coefficients used for the current block to the horizontal scanning order; and if the value of predModeIntra is greater than 34, setting the scanning order of LFNST coefficients used for the current block to the vertical scanning order.

That is to say, if the prediction mode of the current block is a non-MIP mode, then the value of predModeIntra may be determined according to the intra prediction mode; then, according to the value of predModeIntra, the scanning order of LFNST coefficients used for the current block is determined.

S806: constructing a first coefficient matrix by using the LFNST output coefficient matrix according to the scanning order of LFNST coefficients.

It should be noted that the scanning order of LFNST coefficients includes a vertical scanning order and a horizontal scanning order. In addition, after determining the scanning order of LFNST coefficients, the LFNST output coefficient matrix may be used for constructing the first coefficient matrix; herein, the first coefficient matrix may be a two-dimensional primary transform coefficient matrix.

In some embodiments, after S806, the method may further include: constructing an intra prediction value of the current block according to the MIP parameter; performing a transform processing, which is different from the LFNST, on the first coefficient matrix to obtain a residual value of the current block; and calculating a sum of the intra prediction value and the residual value, and using the sum as a reconstructed value of the current block.

That is to say, after the first coefficient matrix is constructed, a first transform may be performed on the first coefficient matrix to obtain the residual value of the current block; herein, the first transform is a transform processing different from the LFNST. In addition, after determining the prediction mode parameter of the current block by parsing the bitstream, if the prediction mode is a MIP mode, the current block may also be predicted according to the MIP mode to obtain the intra prediction value of the current block; the intra prediction value and the residual value are summed, and then the obtained sum is used as the reconstructed value of the current block, thus an encoding and decoding processing on the current block may be achieved, and an original value of the current block can be recovered.

In the embodiment of the present application, applicability of the LFNST technology to the current block using the MIP mode may be improved, so that selection of the scanning order is more flexible. When the LFNST is performed on the current block using the MIP mode, related information of the MIP parameter is introduced, and characteristics of the current block are determined according to this MIP information, and then the scanning order is selected. For example, this transform method is applied to VTM 7.0, and is tested under an All Intra condition at 24-frame intervals. Based on an average bit rate change under a same Peak Signal to Noise Ratio (PSNR), BD-rate changes of −0.03%, 0.00%, and −0.01% may be obtained on three colour components (i.e. Y, Cb, and Cr) respectively.

Especially in a high-resolution sequence, it will have better performance. Specifically, in Class A1, a BD-rate change of −0.10% in Y may be achieved, thus improving a decoding efficiency.

In this embodiment, the transform method is provided, which is applied to the decoder. Following acts are included: determining the prediction mode parameter of the current block by parsing the bitstream; and parsing the bitstream and determining the MIP parameter when the prediction mode parameter indicates that MIP is used for the current block to determine the intra prediction value; parsing the bitstream and determining the transform coefficient matrix and the LFNST index of the current block; processing the transform coefficient matrix of the current block by using the LFNST to obtain the LFNST output coefficient matrix when the LFNST index indicates that the LFNST is used for the current block; determining the scanning order of LFNST coefficients used for the current block according to the MIP parameter; and constructing the first coefficient matrix by using the LFNST output coefficient matrix according to the scanning order of LFNST coefficients; wherein, the scanning order of LFNST coefficients includes the vertical scanning order and the horizontal scanning order. In this way, for the current block using the MIP mode, the MIP parameter is introduced during the LFNST, so that the selection of the scanning order of LFNST coefficients is more flexible, thus not only improving applicability of the LFNST technology to a non-traditional intra prediction mode, but also improving a decoding efficiency and video picture quality.

Figure 10:
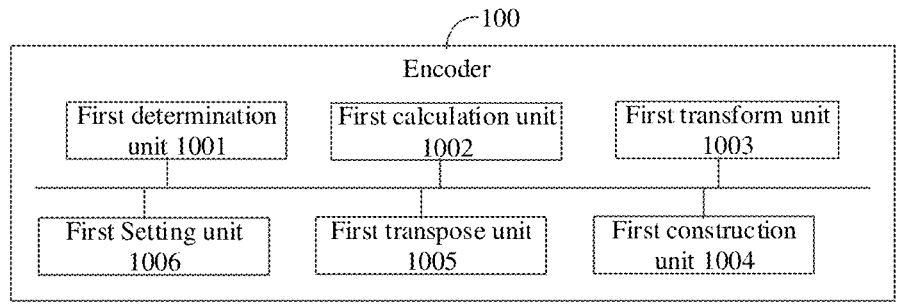
FIG. 10 is a schematic diagram of a composition structure of an encoder according to an embodiment of the present application.

Based on a same inventive concept as the foregoing embodiments, referring to FIG. 10, FIG. 10 shows a schematic diagram of a composition structure of an encoder 100 according to an embodiment of the present application. As shown in FIG. 10, the encoder 100 may include a first determination unit 1001, a first calculation unit 1002, a first transform unit 1003, and a first construction unit 1004; wherein, the first determination unit 1001 is configured to determine a prediction mode parameter of a current block; and to determine a MIP parameter when the prediction mode parameter indicates that MIP is used for the current block to determine an intra prediction value; the first calculation unit 1002 is configured to determine the intra prediction value of the current block according to the MIP parameter, and to calculate a residual value between the current block and the intra prediction value; the first transform unit 1003 is configured to perform a first transform on the residual value to obtain a first coefficient matrix; the first determination unit 1001 is further configured to determine a scanning order of LFNST coefficients used for the current block according to the MIP parameter when an LFNST is used for the current block; the first construction unit 1004 is configured to construct an input coefficient matrix of the LFNST by using the first coefficient matrix according to the scanning order of LFNST coefficients; and the first transform unit 1003 is further configured to perform an LFNST processing on the input coefficient matrix to obtain a transform coefficient matrix of the current block; wherein, the first transform is different from the LFNST, and scanning orders of LFNST coefficients include a horizontal scanning order and a vertical scanning order.

In the aforementioned solution, the MIP parameter may include a MIP transpose indication parameter; wherein, a value of the MIP transpose indication parameter is used for indicating whether to transpose a sample input vector used in a MIP mode.

In the aforementioned solution, referring to FIG. 10, the encoder 100 may further include a first transpose unit 1005, which is configured to set the scanning order of LFNST coefficients to the vertical scanning order when the value of the MIP transpose indication parameter indicates that the sample input vector used in the MIP mode is to be transposed; and to set the scanning order of LFNST coefficients to the horizontal scanning order when the value of MIP transpose indication parameter indicates that the sample input vector used in the MIP mode is not to be transposed.

In the aforementioned solution, the first transpose unit 1005 is further configured to set the scanning order of LFNST coefficients to the horizontal scanning order when the value of the MIP transpose indication parameter indicates that the sample input vector used in the MIP mode is to be transposed; and to set the scanning order of LFNST coefficients to the vertical scanning order when the value of the MIP transpose indication parameter indicates that the sample input vector used in the MIP mode is not to be transposed.

In the aforementioned solution, the MIP parameter includes a MIP mode index, wherein the MIP mode index is used for indicating a MIP mode used for the current block, and the MIP mode is used for indicating a calculation and derivation method of determining the intra prediction value of the current block by using MIP.

In the aforementioned solution, referring to FIG. 10, the encoder 100 may further include a first setting unit 1006, wherein the first determination unit 1001 is further configured to determine a value of an LFNST intra prediction mode index according to the value of the MIP mode index; and the first setting unit 1006 is configured to set the scanning order of LFNST coefficients to a preset scanning order of LFNST coefficients corresponding to the value of the LFNST intra prediction mode index.

In the aforementioned solution, the first determination unit 1001 is further configured to determine the value of the LFNST intra prediction mode index corresponding to the value of the MIP mode index by using a first look-up table, wherein the first look-up table contains at least two LFNST intra prediction mode indices with different values, each of the at least two LFNST intra prediction mode indices corresponding to one or more different MIP mode indices.

In the aforementioned solution, the first setting unit 1006 is further configured to set the scanning order of LFNST coefficients to a preset scanning order of LFNST coefficients corresponding to the value of the MIP mode index.

In the aforementioned solution, the first determination unit 1001 is further configured to determine a scanning order of LFNST coefficients corresponding to the value of the MIP mode index by using a second look-up table; wherein the second look-up table at least contains different scanning orders of LFNST coefficients, each of the different scanning orders of LFNST coefficients corresponding to one or more different MIP mode indices.

In the aforementioned solution, the first setting unit 1006 is further configured to set the scanning order of LFNST coefficients to the horizontal scanning order when the value of the MIP mode index is in a preset range of one or more integers, and to set the scanning order of LFNST coefficients to the vertical scanning order when the value of the MIP mode index is not in the preset range of one or more integers.

In the aforementioned solution, the MIP parameter may further include a MIP transpose indication parameter, the value of which is used for indicating whether to transpose a sample input vector used in the MIP mode.

The first transpose unit 1005 is further configured, when the value of the MIP transpose indication parameter indicates that the sample input vector used in the MIP mode is to be transposed, and if the scanning order of LFNST coefficients used for the current block is a horizontal scanning order, to set the scanning order of LFNST coefficients used for the current block to a vertical scanning order; and to set the scanning order of LFNST coefficients used for the current block to a horizontal scanning order if the scanning order of LFNST coefficients used for the current block is a vertical scanning order.

In the above solution, the first setting unit 1006 is further configured to set the value of the LFNST index to a value corresponding to indicating use of an LFNST, and signal the value of the LFNST index in a video bitstream.

It may be understood that, in the embodiments of the present application, a "unit" may be a portion of a circuit, a portion of a processor, a portion of a program or software, etc.; it, of course, may be a module, or may be non-modular. In addition, various components in the embodiments may be integrated into one processing unit, or various units may exist physically separately, or two or more than two units may be integrated into one unit. The integrated units may be implemented in a form of hardware, or may be implemented in a form of a software functional module.

The integrated unit, if implemented in the form of a software functional module and not sold or used as an independent product, may be stored in a computer readable storage medium. Based on such understanding, the technical solutions of the embodiments, in essence, or a part contributing to the prior art, or all or part of the technical solutions, may be embodied in a form of a software product, and the computer software product is stored in a storage medium, and includes several instructions for enabling a computer device (which may be a personal computer, a server, or a network device, etc.) or a processor to perform all or part of the acts of the methods in the embodiment. The aforementioned storage medium includes various media, such as a U disk, a mobile hard disk, a Read Only Memory (ROM), a Random Access Memory (RAM), a magnetic disk, or an optical disk, which are capable of storing program codes.

Therefore, in an embodiment of the present application, a computer storage medium applied to the encoder 100 is provided, the computer storage medium has stored therein a transform program, when the transform program is executed by a first processor, the method according to any one of the aforementioned embodiments is implemented.

Figure 11:
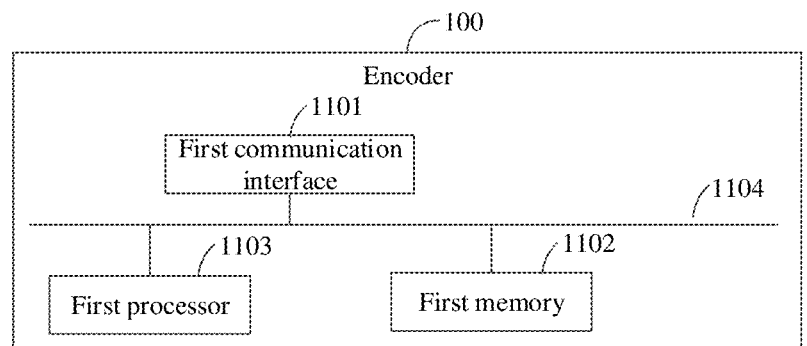
FIG. 11 is a schematic diagram of a specific hardware structure of an encoder according to an embodiment of the present application.

Based on composition of the encoder 100 and the computer storage medium described above, referring to FIG. 11, which shows an example of a specific hardware structure of an encoder 100 according to an embodiment of the present application, the encoder 100 may include a first communication interface 1101, a first memory 1102, and a first processor 1103 coupled together through a first bus system 1104. It may be understood that the first bus system 1104 is used for implementing connection and communication between these components. In addition to including data buses, the first bus system 1104 further includes power buses, control buses, and status signal buses. However, for the sake of clarity, various buses are all labeled as the first bus system 1104 in FIG. 11.

The first communication interface 1101 is configured to receive and send signals in a process of sending and receiving information with other external network elements.

The first memory 1102 is configured to store a computer program runnable on the first processor 1103.

The first processor 1103 is configured to, when running the computer program, determine a prediction mode parameter of a current block; determine a MIP parameter when the prediction mode parameter indicates that MIP is used for the current block to determine an intra prediction value; according to the MIP parameter, determine the intra prediction value of the current block, and calculate a residual value between the current block and the intra prediction value; perform a first transform on the residual value to obtain a first coefficient matrix; when a Low-Frequency Non-Separable Transform (LFNST) is used for the current block, determine a scanning order of LFNST coefficients used for the current block according to the MIP parameter; according to the scanning order of LFNST coefficients, construct an input coefficient matrix of the LFNST by using the first coefficient matrix; and perform an LFNST processing on the input coefficient matrix to obtain a transform coefficient matrix of the current block; wherein, the first transform is a transform different from the LFNST, and scanning orders of LFNST coefficients include a horizontal scanning order and a vertical scanning order.

It may be understood that the first memory 1102 in the embodiment of the present application may be a volatile memory or a non-volatile memory, or may include both a volatile memory and a non-volatile memory. The non-volatile memory may be a Read Only Memory (ROM), a Programmable ROM (PROM), an Erasable PROM (EPROM), an Electrically EPROM (EEPROM), or a flash memory. The volatile memory may be a Random Access Memory (RAM) which serves as an external cache. Through exemplary but non-restrictive description, many forms of RAMs may be available, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDR SDRAM), an Enhanced Synchronous Dynamic Random Access Memory (ESDRAM), a SynchLink Dynamic Random Access Memory (SLDRAM), and a Direct Rambus Random Access Memory (DRRAM). The first memory 1102 in the systems and methods described in the present application is intended to include, but is not limited to, these and any other suitable types of memories.

The first processor 1103 may be an integrated circuit chip having a signal processing capability. In an implementation process, various acts of the foregoing methods may be completed through an integrated logic circuit of hardware in the first processor 1103 or instructions in a form of software. The first processor 1103 described above may be a general purpose processor, a Digital Signal Processor (DSP), an Application Specific Integrated Circuit (ASIC), a Field Programmable Gate Array (FPGA), or another programmable logic device, a discrete gate or a transistor logic device, or a discrete hardware component. The processor may implement or execute various methods, acts, and logic block diagrams disclosed in the embodiments of the present application. The general purpose processor may be a microprocessor or the processor may be any conventional processor or the like. The acts of the methods disclosed in connection with the embodiments of the present application may be directly embodied by execution of a hardware decoding processor, or by execution of a combination of hardware and software modules in a decoding processor. The software modules may be located in a storage medium commonly used in the art, such as a random access memory, a flash memory, a read only memory, a programmable read only memory, or an electrically erasable programmable memory, or a register. The storage medium is located in the first memory 1102, and the first processor 1103 reads information in the first memory 1102 and completes the acts of the foregoing methods in combination with its hardware.

It may be understood that these embodiments described in the present application may be implemented by hardware, software, firmware, middleware, microcode, or a combination thereof. For implementation of hardware, a processing unit may be implemented in one or more Application Specific Integrated Circuits (ASICs), Digital Signal Processors (DSPs), DSP Devices (DSPDs), Programmable Logic Devices (PLDs), Field-Programmable Gate Arrays (FPGAs), general purpose processors, controllers, microcontrollers, microprocessors, other electronic units for performing the functions described in the present application, or combinations thereof. For implementation of software, the techniques described in the present application may be implemented through modules (e.g., processes, functions) that perform the functions described in the present application. Software codes may be stored in a memory and executed by a processor. The memory may be implemented in the processor or external to the processor.

Optionally, as another embodiment, the first processor 1103 is further configured to perform the method according to any one of the aforementioned embodiments when running the computer program.

In this embodiment, an encoder is provided, which may include a first determination unit, a first calculation unit, a first transform unit, and a first construction unit; in this way, for a current block using a MIP mode, a MIP parameter is introduced during an LFNST transform, so that selection of a scanning order of LFNST coefficients is more flexible, thus not only improving applicability of the LFNST technology to a non-traditional intra prediction mode, but also improving an encoding efficiency and video picture quality.

Figure 12:
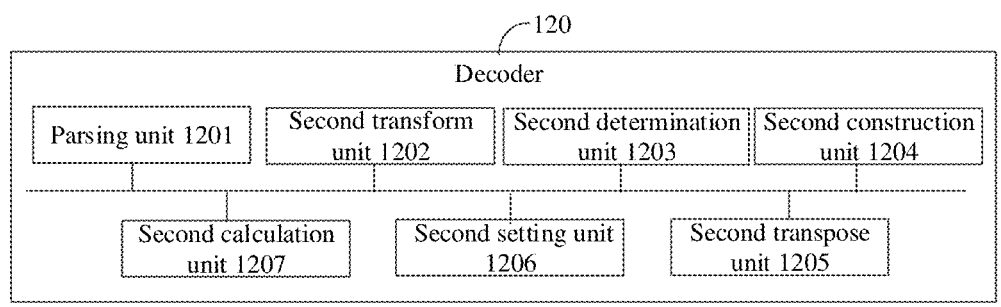
FIG. 12 is a schematic diagram of a composition structure of a decoder according to an embodiment of the present application.

Based on a same inventive concept as the foregoing embodiments, referring to FIG. 12, FIG. 12 shows a schematic diagram of a composition structure of a decoder 120 according to an embodiment of the present application. As shown in FIG. 12, the decoder 120 may include a parsing unit 1201, a second transform unit 1202, a second determination unit 1203, and a second construction unit 1204.

The parsing unit 1201 is configured to parse a bitstream and determine a prediction mode parameter of a current block; and to parse the bitstream and determine a MIP parameter when the prediction mode parameter indicates that MIP is used for the current block to determine an intra prediction value.

The parsing unit 1201 is further configured to parse the bitstream and determine a transform coefficient matrix and an LFNST index of the current block.

The second transform unit 1202 is configured to process the transform coefficient matrix of the current block by using an LFNST to obtain an LFNST output coefficient matrix when the LFNST index indicates that the LFNST is used for the current block.

The second determination unit 1203 is configured to determine a scanning order of LFNST coefficients used for the current block according to the MIP parameter.

The second construction unit 1204 is configured to construct a first coefficient matrix by using the LFNST output coefficient matrix according to the scanning order of LFNST coefficients; wherein, the scanning order of LFNST coefficients includes a vertical scanning order and a horizontal scanning order.

In the aforementioned solution, the MIP parameter may include a MIP transpose indication parameter; wherein, a value of the MIP transpose indication parameter is used for indicating whether to transpose a sample input vector used in a MIP mode.

In the aforementioned solution, referring to FIG. 12, the decoder 120 may further include a second transpose unit 1205, which is configured to set the scanning order of LFNST coefficients to the vertical scanning order when the value of the MIP transpose indication parameter indicates that the sample input vector used in the MIP mode is to be transposed; and to set the scanning order of LFNST coefficients to the horizontal scanning order when the value of the MIP transpose indication parameter indicates that the sample input vector used in the MIP mode is not to be transposed.

In the aforementioned solution, the second transpose unit 1205 is further configured to set the scanning order of LFNST coefficients to the horizontal scanning order when the value of the MIP transpose indication parameter indicates that the sample input vector used in the MIP mode is to be transposed; and to set the scanning order of LFNST coefficients to the vertical scanning order when the value of the MIP transpose indication parameter indicates that the sample input vector used in the MIP mode is not to be transposed.

In the aforementioned solution, the MIP parameter includes a MIP mode index, wherein the MIP mode index is used for indicating a MIP mode used for the current block, and the MIP mode is used for indicating a calculation and derivation method of determining the intra prediction value of the current block by using MIP.

In the aforementioned solution, referring to FIG. 12, the decoder 120 may further include a second setting unit 1206. The second determination unit 1203 is further configured to determine a value of the LFNST intra prediction mode index according to the value of the MIP mode index.

The second setting unit 1206 is configured to set a scanning order of LFNST coefficients to a preset scanning order of LFNST coefficients corresponding to the value of the LFNST intra prediction mode index.

In the aforementioned solution, the second determination unit 1203 is further configured to determine the value of the LFNST intra prediction mode index corresponding to the value of the MIP mode index by using a first look-up table, wherein the first look-up table contains at least two LFNST intra prediction mode indices with different values, each of the at least two LFNST intra prediction mode indices corresponding to one or more different MIP mode indices.

In the aforementioned solution, the second setting unit 1206 is further configured to set a scanning order of LFNST coefficients to a preset scanning order of LFNST coefficients corresponding to the value of the MIP mode index.

In the aforementioned solution, the second determination unit 1203 is further configured to determine a scanning order of LFNST coefficients corresponding to the value of the MIP mode index by using a second look-up table; wherein the second look-up table at least contains different scanning orders of LFNST coefficients, each of the different scanning orders of LFNST coefficients corresponding to one or more different MIP mode indices.

In the aforementioned solution, the second setting unit 1206 is further configured to set the scanning order of LFNST coefficients to the horizontal scanning order when the value of the MIP mode index is in a preset range of one or more integers, and to set the scanning order of LFNST coefficients to the vertical scanning order when the value of the MIP mode index is not in the preset range of one or more integers.

In the aforementioned solution, the MIP parameter may further include a MIP transpose indication parameter, the value of which is used for indicating whether to transpose a sample input vector used in a MIP mode.

The second transpose unit 1205 is further configured, when the value of the MIP transpose indication parameter indicates that the sample input vector used in the MIP mode is to be transposed, and if the scanning order of LFNST coefficients used for the current block is the horizontal scanning order, to set the scanning order of LFNST coefficients used for the current block to the vertical scanning order; and to set the scanning order of LFNST coefficients used for the current block to the horizontal scanning order if the scanning order of the LFNST coefficients used for the current block is the vertical scanning order.

In the aforementioned solution, referring to FIG. 12, the decoder 120 may further include a second calculation unit 1207.

The second construction unit 1204 is configured to construct an intra prediction value of the current block according to the MIP parameter.

The transform unit 1202 is configured to perform a transform processing, which is different from an LFNST, on the first coefficient matrix to obtain a residual value of the current block.

The second calculation unit 1207 is configured to calculate a sum of the intra prediction value and the residual value, and set the sum to a reconstructed value of the current block.

It may be understood that, in the embodiments of the present application, a "unit" may be a portion of a circuit, a portion of a processor, a portion of a program or software, etc., of course, it may be a module, or may be non-modular. In addition, various components in the embodiments may be integrated into one processing unit, or various units may exist physically separately, or two or more than two units may be integrated into one unit. The integrated units may be implemented in a form of hardware, or may be implemented in a form of a software functional module.

The integrated unit, if implemented in a form of a software functional module and not sold or used as an independent product, may be stored in a computer-readable storage medium. Based on such understanding, in an embodiment, a computer storage medium applied to the decoder 120 is provided, the computer storage medium has stored therein a transform program, when the transform program is executed by a second processor, the method according to any one of the aforementioned embodiments is implemented.

Figure 13:
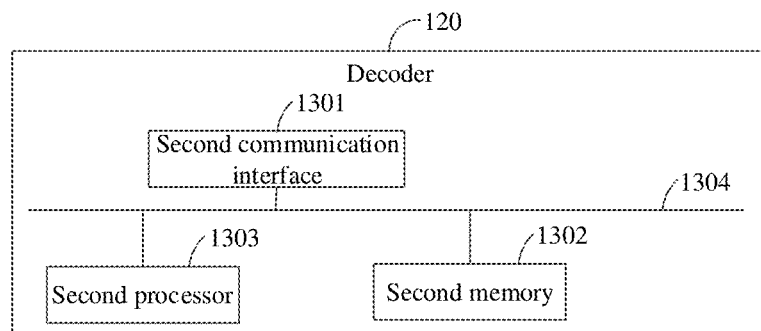
FIG. 13 is a schematic diagram of a specific hardware structure of a decoder according to an embodiment of the present application.

Based on composition of the decoder 120 and the computer storage medium described above, referring to FIG. 13, which shows an example of a specific hardware structure of a decoder 120 according to an embodiment of the present application. The decoder 120 may include a second communication interface 1301, a second memory 1302, and a second processor 1303 coupled together through a second bus system 1304. It may be understood that the second bus system 1304 is used for implementing connection and communication between these components. In addition to including data buses, the second bus system 1304 further includes power buses, control buses, and status signal buses. However, for the sake of clarity, various buses are all labeled as the second bus system 1304 in FIG. 13.

The second communication interface 1301 is configured to receive and send signals in a process of sending and receiving information with other external network elements.

The second memory 1302 is configured to store a computer program runnable on the second processor 1303.

The second processor 1303 is configured to, when running the computer program, parse a bitstream and determine a prediction mode parameter of a current block; parse the bitstream and determine a MIP parameter when the prediction mode parameter indicates that MIP is used for the current block to determine an intra prediction value; parse the bitstream and determine a transform coefficient matrix and an LFNST index of the current block; when the LFNST index indicates that an LFNST is used for the current block, process the transform coefficient matrix of the current block by using the LFNST to obtain an LFNST output coefficient matrix; determine a scanning order of LFNST coefficients used for the current block according to the MIP parameter; and according to the scanning order of LFNST coefficients, construct a first coefficient matrix by using the LFNST output coefficient matrix; wherein, the scanning order of LFNST coefficients includes a vertical scanning order and a horizontal scanning order.

Optionally, as another embodiment, the second processor 1303 is further configured to perform the method according to any one of the aforementioned embodiments when running the computer program.

It may be understood that hardware functions of the second memory 1302 are similar to those of the first memory 1102 and hardware functions of the second processor 1303 are similar to those of the first processor 1103, which will not be repeated here.

In this embodiment, a decoder is provided, which may include a parsing unit, a second transform unit, a second determination unit, and a second construction unit. In this way, for a current block using a MIP mode, a MIP parameter is introduced during an LFNST transform, so that selection of a scanning order of LFNST coefficients is more flexible, thus not only improving applicability of the LFNST technology to a non-traditional intra prediction mode, but also improving a decoding efficiency and video picture quality.

It should be noted that in the present application, the terms "include", "contain", or any other variations thereof are intended to cover a non-exclusive inclusion, such that a process, method, article, or apparatus that includes a series of elements includes not only those elements but also other elements not expressly listed, or further includes elements inherent to such a process, method, article, or apparatus. An element defined by a statement "include one" does not exclude presence of additional identical elements in a process, method, article, or apparatus that includes the element, without more limitations.

The aforementioned serial numbers of the embodiments of the present application are only for description, and do not represent superiority and inferiority of the embodiments.

The methods disclosed in several method embodiments according to the present application may be arbitrarily combined without conflict, to obtain new method embodiments.

Features disclosed in several product embodiments according to the present application may be arbitrarily combined without conflict, to obtain new product embodiments.

Features disclosed in several method or device embodiments according to the present application may be arbitrarily combined without conflict, to obtain new method embodiments or device embodiments.

The foregoing are merely specific embodiments of the present application, but the protection scope of the present application is not limited thereto. Any person skilled in the art may readily conceive variations or substitutions within the technical scope disclosed by the present application, which should be included within the protection scope of the present application. Therefore, the protection scope of the present application shall be subject to the protection scope of the claims.

INDUSTRIAL APPLICABILITY

In the embodiment of the present application, firstly, a prediction mode parameter of a current block is determined; a MIP parameter is determined when the prediction mode parameter indicates that MIP is used for the current block to determine an intra prediction value; according to the MIP parameter, the intra prediction value of the current block is determined, and a residual value between the current block and the intra prediction value is calculated; a first transform is performed on the residual value to obtain a first coefficient matrix; a scanning order of LFNST coefficients used for the current block is determined according to the MIP parameter when an LFNST is used for the current block; then, according to the scanning order of LFNST coefficients, an input coefficient matrix of the LFNST is constructed by using the first coefficient matrix; finally, an LFNST processing is performed on the input coefficient matrix to obtain a transform coefficient matrix of the current block; wherein, the first transform is a transform different from the LFNST, and scanning orders of LFNST coefficients include a horizontal scanning order and a vertical scanning order. In this way, for a current block using a MIP mode, the MIP parameter is introduced during an LFNST transform, so that selection of a scanning order of LFNST coefficients is more flexible, thus not only improving applicability of an LFNST technology to a non-traditional intra prediction mode, but also improving encoding and decoding efficiencies and video picture quality.

What is claimed is:

1. A transform method, applied to an encoder, the method comprising:
   determining a prediction mode parameter of a current block;
   determining a Matrix-based Intra Prediction (MIP) parameter when the prediction mode parameter indicates that MIP is used for the current block to determine an intra prediction value;
   determining the intra prediction value of the current block according to the MIP parameter, and calculating a residual value between the current block and the intra prediction value;
   performing a first transform on the residual value to obtain a first coefficient matrix; wherein the first transform is a transform different from Low-Frequency Non-Separable Transform (LFNST);
   determining a scanning order of LFNST coefficients used for the current block according to the MIP parameter when an LFNST is used for the current block; wherein the scanning order of LFNST coefficients comprises a horizontal scanning order or a vertical scanning order;
   constructing an input coefficient matrix of the LFNST based on the obtained first coefficient matrix according to the scanning order of LFNST coefficients, wherein the obtained first coefficient matrix comprises a two-dimensional primary transform coefficient matrix; and
   performing an LFNST processing on the constructed input coefficient matrix to obtain a transform coefficient matrix of the current block;
   wherein the MIP parameter comprises a MIP mode index, wherein the MIP mode index is used for indicating a MIP mode used for the current block, and the MIP mode is used for indicating a calculation and derivation method of determining the intra prediction value of the current block by using MIP;
   wherein the determining the scanning order of LFNST coefficients used for the current block according to the MIP parameter comprises:
   setting the scanning order of LFNST coefficients to a preset scanning order of LFNST coefficients corresponding to a value of the MIP mode index.

2. The method according to claim 1, further comprising:
   determining the scanning order of LFNST coefficients corresponding to the value of the MIP mode index by using a second look-up table;
   wherein the second look-up table at least contains different scanning orders of LFNST coefficients, each of the different scanning orders of LFNST coefficients corresponding to one or more different MIP mode indices.

3. The method according to claim 1, further comprising:
   setting the scanning order of LFNST coefficients to a horizontal scanning order when the value of the MIP mode index is in a preset range of one or more integers; and
   setting the scanning order of LFNST coefficients to a vertical scanning order when the value of the MIP mode index is not in the preset range of one or more integers.

4. A transform method, applied to a decoder, the method comprising:
   parsing a bitstream and determining a prediction mode parameter of a current block;
   parsing the bitstream and determining a Matrix-based Intra Prediction (MIP) parameter when the prediction mode parameter indicates that MIP is used for the current block to determine an intra prediction value;
   parsing the bitstream and determining a transform coefficient matrix and a Low-Frequency Non-Separable Transform (LFNST) index of the current block;
   processing the transform coefficient matrix of the current block by using an LFNST to obtain an LFNST output coefficient matrix when the LFNST index indicates that the LFNST is used for the current block;
   determining a scanning order of LFNST coefficients used for the current block according to the MIP parameter, wherein the scanning order of LFNST coefficients comprises a vertical scanning order or a horizontal scanning order; and
   constructing a first coefficient matrix based on the LFNST output coefficient matrix according to the scanning order of LFNST coefficients; wherein the constructed first coefficient matrix comprises a two-dimensional primary transform coefficient matrix;
   wherein the MIP parameter comprises a MIP mode index, wherein the MIP mode index is used for indicating a MIP mode used for the current block, and the MIP mode is used for indicating a calculation and derivation method of determining the intra prediction value of the current block by using MIP;
   wherein the determining the scanning order of LFNST coefficients used for the current block according to the MIP parameter comprises:
   setting the scanning order of LFNST coefficients to a preset scanning order of LFNST coefficients corresponding to a value of the MIP mode index.

5. The method according to claim 4, further comprising:
   determining the scanning order of LFNST coefficients corresponding to the value of the MIP mode index by using a second look-up table;

wherein the second look-up table at least contains different scanning orders of LFNST coefficients, each of the different scanning orders of LFNST coefficients corresponding to one or more different MIP mode indices.

6. The method according to claim 4, further comprising:
setting the scanning order of LFNST coefficients to a horizontal scanning order when the value of the MIP mode index is in a preset range of one or more integers; and
setting the scanning order of LFNST coefficients to a vertical scanning order when the value of the MIP mode index is not in the preset range of one or more integers.

7. The method according to claim 4, further comprising:
determining the intra prediction value of the current block according to the MIP parameter;
performing a transform processing, which is different from the LFNST, on the first coefficient matrix to obtain a residual value of the current block; and
determining a reconstructed value of the current block based on the intra prediction value and the residual value.

8. An encoder comprising a first memory and a first processor, wherein the first memory is configured to store a computer program runnable on the first processor; and the first processor is configured to perform the method according to claim 1 when running the computer program.

9. A decoder comprising a second memory and a second processor, wherein the second memory is configured to store a computer program runnable on the second processor; and the second processor is configured to perform the method according to claim 4 when running the computer program.

10. A non-transitory computer storage medium having stored therein a computer program, wherein, the method according to claim 4 is implemented when the computer program is executed by a processor.

* * * * *